(12) United States Patent
Masae et al.

(10) Patent No.: US 10,025,161 B2
(45) Date of Patent: Jul. 17, 2018

(54) LIGHT AMOUNT ADJUSTING DEVICE

(71) Applicant: Hanwha Techwin Co., Ltd., Changwon-si (KR)

(72) Inventors: Miyakawa Masae, Changwon-si (KR); Nam Il Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 15/393,925

(22) Filed: Dec. 29, 2016

(65) Prior Publication Data

US 2017/0192337 A1    Jul. 6, 2017

(30) Foreign Application Priority Data

Dec. 31, 2015    (KR) .................. 10-2015-0191121

(51) Int. Cl.
| | |
|---|---|
| *G03B 9/02* | (2006.01) |
| *G02B 5/00* | (2006.01) |
| *G02B 26/02* | (2006.01) |
| *G03B 9/06* | (2006.01) |

(52) U.S. Cl.
CPC ............... *G03B 9/02* (2013.01); *G02B 5/005* (2013.01); *G02B 26/023* (2013.01); *G03B 9/06* (2013.01)

(58) Field of Classification Search
None
See application file for complete search history.

(56) References Cited

U.S. PATENT DOCUMENTS

| | | | |
|---|---|---|---|
| 5,315,889 A | 5/1994 | Moro et al. | |
| 2005/0226611 A1* | 10/2005 | Kawaguchi | G03B 9/02 396/505 |
| 2009/0034046 A1 | 2/2009 | Bai | |
| 2010/0158505 A1* | 6/2010 | Horidan | G03B 9/06 396/508 |
| 2011/0091198 A1 | 4/2011 | Hasegawa | |

(Continued)

FOREIGN PATENT DOCUMENTS

| | | |
|---|---|---|
| EP | 2 056 160 A1 | 5/2009 |
| EP | 2 610 670 A1 | 7/2013 |

(Continued)

OTHER PUBLICATIONS

Communication dated Jun. 1, 2017 issued by the European Patent Office in counterpart European Patent Application No. 16207048.6.

*Primary Examiner* — William Perkey
(74) *Attorney, Agent, or Firm* — Sughrue Mion, PLLC

(57) ABSTRACT

A light amount adjusting device includes: a first linear movement wing and a second linear movement wing respectively connected to a first side of a rotation center of the link and a second side opposite to the first side of the rotation center of the link, each of the first and second linear movement wings provided on the case and configured to linearly move in linear directions between a first position of the first linear movement wing; and a first rotation wing and a second rotation wing respectively connected to the link and rotatably coupled to the case so as to be rotated between a first position of the first and second rotation wings at which at least a portion of the aperture of the case is closed and a second position of the first and the second rotation wing at which the aperture of the case is opened.

20 Claims, 23 Drawing Sheets

(56) References Cited

U.S. PATENT DOCUMENTS

2015/0346583 A1 12/2015 Yoshizawa et al.
2017/0192337 A1* 7/2017 Masae .................... G02B 5/005

FOREIGN PATENT DOCUMENTS

| JP | 10-62835 A | 3/1998 |
|----|------------|--------|
| JP | 10-301159 A | 11/1998 |
| JP | 3802870 B2 | 7/2006 |
| JP | 2009-31664 A | 2/2009 |
| JP | 4735997 B2 | 7/2011 |
| JP | 2012-220761 A | 11/2012 |
| JP | 5173979 B2 | 4/2013 |
| KR | 1993-0000979 A | 1/1993 |

* cited by examiner

LIGHT AMOUNT ADJUSTING DEVICE

CROSS-REFERENCE TO THE RELATED APPLICATION

This application claims priority from Korean Patent Application No. 10-2015-0191121, filed on Dec. 31, 2015, in the Korean Intellectual Property Office, the disclosure of which is incorporated herein in its entirety by reference.

BACKGROUND

1. Field

Apparatuses consistent with exemplary embodiments relate to a light amount adjusting device, and more particularly, to a light amount adjusting device having a compact structure and having optical performance improved by maintaining an aperture through which light passes in a hexagonal shape similar to a circular shape when adjusting the size of the aperture.

2. Description of the Related Art

In photographing apparatuses such as digital cameras, video cameras, or CCTVs, an image sensor receives light from an object and converts the light into an electric signal, and a light amount adjusting device such as an aperture stop adjusts the size of an aperture through which light is incident on the image sensor.

Photographing apparatuses such as surveillance cameras also include a light amount adjusting device configured to block the path of light for adjusting the amount of light and responsivity to light. If the depth of field is adjusted by varying the size of an opened area using a light amount adjusting device, a distant or close object may be clearly photographed.

Korean Patent Application Laid-open Publication No. 1993-0000979 discloses a light amount adjusting device of the related art. When the size of an aperture through which light passes is adjusted using the light amount adjusting device disclosed in the above-identified Publication, the shape of the aperture is irregularly varied, which may cause i) imbalanced variations in the amount of light, ii) occurrence of asymmetric diffraction or chromatic aberration at an image sensor, or iii) splitting or spreading of light. Particularly, when the size of an aperture of an aperture stop is maximally reduced, the aperture is shaped almost like a rhombus, causing failure in focusing and blurs in images. In addition, for example, when a scene including a very bright object such as a region in which light passes between leaves is photographed, the region is blurred and shaped like a rhombus which is similar to the aperture shape of an aperture stop, and thus unnatural images may be captured.

FIG. 23 is s schematic view illustrating an example of light amount adjusting devices of the related art.

The light amount adjusting device of the related art illustrated in FIG. 23 has a mechanism in which an aperture 511 is closed or opened using wings 520 and 530, each having a recess 521 and 531, respectively.

Although the aperture 511 for sending light to a photographing apparatus is designed to have a circular shape as a whole, as the light amount adjusting device is operated, a shape of a hole formed by the wings 520 and 530 of the light amount adjusting device does not match the shape of the aperture 511, and thus light may split or spread. That is, if the light amount adjusting device of the related art is used, partially unfocused images may be captured. In addition, because the aperture 511 of the light amount adjusting device is shaped like a rhombus relatively long in a horizontal or vertical direction, optical aberrations may be different in longitudinal and lateral directions. Therefore, the resolution of captured images may be imbalanced in the longitudinal and lateral directions, and the amount of light may differ in the longitudinal and lateral directions. That is, the quality of captured images may be low.

It has been attempted to vary the shape of the aperture of the light amount adjusting device to a polygonal shape similar to a circular shape. According to the attempt, however, the number of wings forming the aperture is increased, and the amount of movement of the wings is increased. Thus, it is difficult to manufacture light amount adjusting devices having a small size. For example, if a light amount adjusting device having a hexagonal aperture is designed using six wings, a relatively large motor is used to drive the six wings, and the number of components and the overall volume of the light amount adjusting device are increased.

The structure of a light amount adjusting device including three linear movement wings is disclosed in Japanese Patent Application Laid-open Publication No. 1998-301159 and Japanese Patent No. 5173979. According to the disclosed structure, the distances that the wings travel from maximally opened positions to closed positions are relatively long. Thus, the size of the light amount adjusting device is increased in width and length directions because the length of a rotary link driving the wings is increased to increase the amounts of movement of the wings. That is, it is difficult to reduce the size of the light amount adjusting device.

Japanese Patent No. 4735997 discloses the structure of a light amount adjusting device including six wings: two linear movement wings and four rotation wings. According to the disclosed structure, the light amount adjusting device may maintain a hexagonal aperture shape. However, because a disk member connected to the six wings using pins is placed in the light amount adjusting device to drive the six wings, the number of components, size, and thickness of the light amount adjusting device increase. In addition, due to friction between the disk member and the six wings, torque for driving the disk member and the six wings increases, and thus a large driving motor and a large decelerator are used.

Light amount adjusting devices of the related art having a polygonal aperture as described above have a relatively large volume and a relatively large number of components, and incur high manufacturing costs, and thus it is difficult to apply such light amount adjusting devices to apparatuses such as surveillance cameras or camcorders.

SUMMARY

One or more exemplary embodiments provide a light amount adjusting device having improved optical performance.

One or more exemplary embodiments also provide a light amount adjusting device configured to prevent optical errors such as splitting or spreading of light when an aperture through which light passes is varied during operations of the light amount adjusting device.

One or more exemplary embodiments also provide a light amount adjusting device configured to maintain an aperture through which light passes in a hexagonal shape similar to a circular shape while minimizing the number of components and minimizing the volume of the light amount adjusting device.

Additional aspects will be set forth in part in the description which follows and, in part, will be apparent from the description, or may be learned by practice of the presented exemplary embodiments.

According to an aspect of an exemplary embodiment, there is provided a light amount adjusting device including: a case including an aperture through which light passes; a link rotatable on the case; a driving unit connected to the link and generating driving force for rotating the link; a first linear movement wing and a second linear movement wing respectively connected to a side of a rotation center of the link and other side of the rotation center of the link, each of the first and second linear movement wings being placed on the case and linearly movable between a position at which at least a portion of the aperture of the case is closed and a position at which the aperture of the case is opened; a first rotation wing connected to the link and rotatably coupled to the case so as to be rotated in directions crossing linear movement directions of the first and second linear movement wings between a position at which at least a portion of the aperture of the case is closed and a position at which the aperture of the case is opened; and a second rotation wing connected to the link and rotatably coupled to the case so as to be rotated in directions crossing linear movement directions of the first and second linear movement wings between a position at which at least a portion of the aperture of the case is closed and a position at which the aperture of the case is opened.

The light amount adjusting device may further include a linear guide provided between the case and the first linear movement wing and between the case and the second linear movement wing so as to guide linear movement of the first and second linear movement wings, and wherein the first and second linear movement wings may move in opposite directions with respect to each other.

The linear guide may include: a linear movement guide protrusion arranged on an inner side of the case; and a linear slot formed in the first and second linear movement wings to receive the linear movement guide protrusion.

The first and second rotation wings may include an accommodation recess accommodating the linear movement guide protrusion of the case when the first and second rotation wings are at the positions at which the aperture of the case is opened.

Each of the first and second linear movement wings may include an opening corresponding to at least a portion of the aperture of the case so as to pass light.

The link may include a first connection protrusion protruding from the side of the link, a second connection protrusion protruding from the other side of the link, and a third connection protrusion protruding between the first connection protrusion and the rotation center of the link; and the first linear movement wing may include a first connection hole receiving the first connection protrusion, and the second linear movement wing may include a second connection hole receiving the second connection protrusion.

Each of the first and second connection holes may extend in a direction crossing linear movement directions of the first and second linear movement wings.

A distance between the first connection protrusion and the rotation center of the link may be identical to a distance between the second connection protrusion and the rotation center of the link.

The first rotation wing may include a first rotation guide hole receiving the third connection protrusion and extending in a curved shape, and the second rotation wing may include a second rotation guide hole receiving the second connection protrusion and extending in a curved shape.

The second rotation guide hole may include: a cam hole guiding rotation of the second rotation wing; and a circumferential hole connected to the cam hole and extending in a circumferential direction with respect to the rotation center of the link.

The case may further include a rotation support shaft rotatably supporting the first and second rotation wings, and the first and second rotation wings may rotate in opposite directions with respect to each other.

Rotation centers of the first and second rotation wings may be on a straight line passing through a center of the aperture of the case and the rotation center of the link.

The case further may include a linear protrusion protruding from an inside of the case so as to contact at least one of surfaces of the first linear movement wing and the second linear movement wing.

The light amount adjusting device may further include a cover including an outer aperture corresponding to the aperture of the case and coupled to the case so as to cover the first and second linear movement wings, the first and second rotation wings, and the link.

The cover may further include outer rotation slot portions into which end portions of the first and second connection protrusions are respectively inserted, the outer rotation slot portions extending in the circumferential direction with respect to the rotation center of the link and guiding rotation of the first and second connection protrusions.

The cover may further include an inner rotation slot portion into which an end portion of the third connection protrusion is inserted, the inner rotation slot portion extending in the circumferential direction with respect to the rotation center of the link and guiding rotation of the third connection protrusion.

The light amount adjusting device may further include a cover including a rotation guide rail curved by extending in a rotation direction of the first and second rotation wings and guiding rotation movement of the first and second rotation wings by contacting at least one of the first and second rotation wings.

The link may include a first connection protrusion protruding from the side of the link and a second connection protrusion protruding from the other side of the line, the first linear movement wing may include a first connection hole receiving the first connection protrusion, the second linear movement wing may include a second connection hole receiving the second connection protrusion, the first rotation wing may include a first rotation guide hole receiving the first connection protrusion and extending in a curved shape, and the second rotation wing may include a second rotation guide hole receiving the second connection protrusion and extending in a curved shape.

The first rotation guide hole may include: a first cam hole guiding rotation of the first rotation wing; and a first circumferential hole connected to the first cam hole and extending in a circumferential direction with respect to the rotation center of the link, wherein the second rotation guide hole may include: a second cam hole guiding rotation of the second rotation wing; and a second circumferential hole connected to the second cam hole and extending in a circumferential direction with respect to the rotation center of the link.

According to an aspect of an exemplary embodiment, there is provided a light amount adjusting device including: a case including an aperture through which light passes; a link rotatably coupled to the case; a driver configured to generate a driving force for rotating the link; a first linear movement wing and a second linear movement wing respectively connected to a first side of a rotation center of the link and a second side opposite to the first side of the rotation center of the link, each of the first and second linear movement wings provided on the case and configured to linearly move in linear directions between a first position of the first linear movement wing and the second linear movement wing at which at least a portion of the aperture of the case is closed and a second position of the first linear movement wing and the second linear movement wing at which the aperture of the case is opened; a first rotation wing connected to the link and rotatably coupled to the case so as to be rotated between a first position of the first rotation wing at which at least a portion of the aperture of the case is closed and a second position of the first rotation wing at which the aperture of the case is opened, the first rotation wing configured to rotate in directions crossing the linear directions of the first and second linear movement wings; and a second rotation wing connected to the link and rotatably coupled to the case so as to be rotated between a first position of the second rotation wing at which at least a portion of the aperture of the case is closed and a second position of the second rotation wing at which the aperture of the case is opened, the second rotation wing configured to rotate in directions crossing the linear directions of the first and second linear movement wings.

The light amount adjusting device may further include a plurality of linear guides provided between the case and the first linear movement wing and between the case and the second linear movement wing so as to guide linear movement of the first and second linear movement wings, and the first and second linear movement wings may move in opposite directions with respect to each other.

Each of the plurality of the linear guides may include: a linear movement guide protrusion arranged on an inner side of the case; and a linear slot formed in the first and second linear movement wings to receive the linear movement guide protrusion.

Each of the first and second rotation wings may include an accommodation recess configured to accommodate the linear movement guide protrusion of the case in response to the first and second rotation wings being at the second positions at which the aperture of the case is opened.

Each of the first and second linear movement wings may include an opening corresponding to at least a portion of the aperture of the case so as to pass light.

The link may include: a first connection protrusion protruding from the first side of the link; a second connection protrusion protruding from the second side of the link; and a third connection protrusion protruding between the first connection protrusion and the rotation center of the link; and the first linear movement wing may include a first connection hole configured to engage with the first connection protrusion, and the second linear movement wing includes a second connection hole configured to engage with the second connection protrusion.

Each of the first and second connection holes may extend in a direction crossing the linear directions of the first and second linear movement wings.

The first rotation wing may include a first rotation guide hole configured to engage with the third connection protrusion, the first rotation guide hole extending in a curved shape, and the second rotation wing may include a second rotation guide hole configured to engage with the second connection protrusion, the second rotation wing extending in a curved shape.

The second rotation guide hole may include: a cam hole configured to guide rotation of the second rotation wing; and a circumferential hole connected to the cam hole and extending in a circumferential direction with respect to the rotation center of the link.

The case may further include a rotation support shaft rotatably supporting the first and second rotation wings, and the first and second rotation wings may rotate in opposite directions with respect to each other.

Rotation centers of the first and second rotation wings may be on a line passing through a center of the aperture of the case and the rotation center of the link.

The case further may include a linear protrusion protruding from an inside of the case and configured to contact at least one of a surface of the first linear movement wing and a surface of the second linear movement wing.

The light amount adjusting device may further include a cover having an outer aperture corresponding to the aperture of the case, the cover coupled to the case and configured to cover the first and second linear movement wings, the first and second rotation wings, and the link.

The cover may further include outer rotation slot portions into which end portions of the first and second connection protrusions are respectively inserted, the outer rotation slot portions extending in the circumferential direction with respect to the rotation center of the link and configured to guide rotation of the first and second connection protrusions.

The cover may further include an inner rotation slot portion into which an end portion of the third connection protrusion is inserted, the inner rotation slot portion extending in the circumferential direction with respect to the rotation center of the link and configured to guide rotation of the third connection protrusion.

The light amount adjusting device may further include a cover having a rotation guide rail having a curved shape and extending in a rotation direction of the first and second rotation wings, the rotation guide rail configured to guide rotation movement of the first and second rotation wings by contacting at least one of the first and second rotation wings.

The link may include: a first connection protrusion protruding from the side of the link; and a second connection protrusion protruding from the other side of the line, where the first linear movement wing may include a first connection hole configured to engage with the first connection protrusion, where the second linear movement wing may include a second connection hole configured to engage with the second connection protrusion, where the first rotation wing may include a first rotation guide hole configured to engage with the first connection protrusion and extending in a curved shape, and where the second rotation wing may include a second rotation guide hole configured to engage with the second connection protrusion and extending in a curved shape.

The first rotation guide hole may include: a first cam hole configured to guide rotation of the first rotation wing; and a first circumferential hole connected to the first cam hole and extending in a circumferential direction with respect to the rotation center of the link. The second rotation guide hole may include: a second cam hole configured to guide rotation of the second rotation wing; and a second circumferential hole connected to the second cam hole and extending in a circumferential direction with respect to the rotation center of the link.

According to an aspect of an exemplary embodiment, there is provided a light amount adjusting device including: a case including an aperture through which light passes; a link rotatably coupled to the case; a driver configured to generate a driving force for rotating the link; a plurality of wings configured to form the aperture through which the light passes in a hexagonal shape, the plurality of wings including: a first linear movement wing and a second linear movement wing, the first and the second linear movement wings having symmetrical shapes and configured to linearly move in linear directions between a first position of the first linear movement wing and the second linear movement wing at which at least a portion of the aperture of the case is closed and a second position of the first linear movement wing and the second linear movement wing at which the aperture of the case is opened; and a first rotation wing and a second rotation wing, the first and second rotation wings being connected to the link and rotatably coupled to the case so as to be rotated between a first position of the first rotation wing at which at least a portion of the aperture of the case is closed and a second position of the first rotation wing at which the aperture of the case is opened, wherein the first and the second linear movement wings move in opposite directions of each other, and wherein the first and the second rotation wings move in opposite directions of each other

BRIEF DESCRIPTION OF THE DRAWINGS

The above and/or other aspects of the disclosure will become apparent and more readily appreciated from the following description of the exemplary embodiments, taken in conjunction with the accompanying drawings in which.

DETAILED DESCRIPTION

Figure 1:
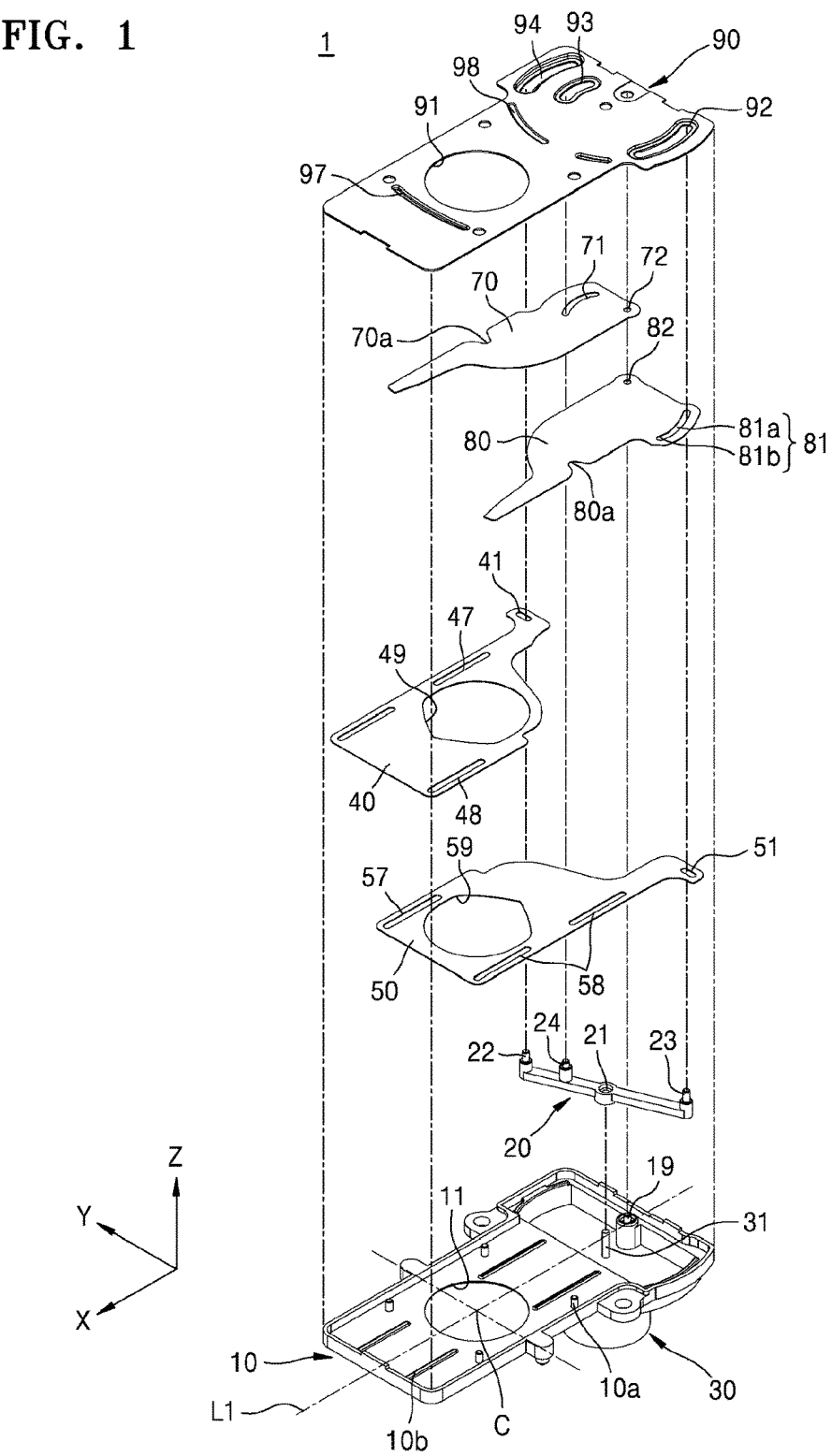
FIG. 1 is an exploded perspective view schematically illustrating a coupling relationship between elements of a light amount adjusting device according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

Hereinafter, the structures and operations of light amount adjusting devices will be described according to exemplary embodiments with reference to the accompanying drawings. In the following description, the term "and/or" includes any and all combinations of one or more of the associated listed items.

FIG. 1 is an exploded perspective view schematically illustrating a coupling relationship between elements of a light amount adjusting device 1 according to an exemplary embodiment.

Referring to FIG. 1, the light amount adjusting device 1 of the exemplary embodiment includes: a case 10 including an aperture 11 through which light passes; a link 20 rotatably connected to the case 10; a driving unit 30 connected to the link 20 and configured to generate driving force to rotate the link 20 with respect to the case; a first linear movement wing 40 and a second linear movement wing 50 connected to the link 20 and configured to be linearly moved along the case 10; and a first rotation wing 70 and a second rotation wing 80 connected to the link 20 and rotatably coupled to the case 10 so as to be rotated across movement directions of the first linear movement wing 40 and the second linear movement wing 50.

The light amount adjusting device 1 having the above-described structure may be applied to various photographing apparatuses such as digital still cameras configured to capture still images, digital video cameras configured to take videos, or surveillance cameras such as CCTVs.

The case 10 has a function of allowing light to reach an image sensor of a photographing apparatus through the aperture 11 of the case 10 and a function of supporting other elements such as the first linear movement wing 40, the second linear movement wing 50, the driving unit 30, the link 20, the first rotation wing 70, and the second rotation wing 80 in the case 10. For example, the case 10 may include a material such as a plastic material or a thin metal plate.

The first linear movement wing 40, the second linear movement wing 50, the first rotation wing 70, the second rotation wing 80, and the link 20 are accommodated in the case 10.

A cover 90 may be coupled to an upper surface of the case 10. The cover 90 includes an outer aperture 91 having a shape corresponding to the aperture 11 of the case 10. The cover 90 may be made of a material such as a plastic material or may be made as a metal plate.

The first and second linear movement wings 40 and 50 are supported by the case 10 and are configured to linearly move along in the case 10. The first and second linear movement wings 40 and 50 may be linearly moved in an x-axis direction as shown in FIG. 1. The first and second linear movement wings 40 and 50 are movable in opposite directions (e.g., −x or +x axis direction) across a path of light passing through the aperture 11.

The first and second linear movement wings 40 and 50 are arranged in the case 10 and configured to be moved in linear directions for opening the aperture 11 of the case 10, that is, in linear directions away from each other or to be moved in linear directions for closing the aperture 11 of the case 10, that is, in linear directions toward each other.

The first and second linear movement wings 40 and 50 respectively include a first opening 49 and a second opening 59, each sized according to the aperture 11 of the case 10 and corresponding to a portion of the aperture 11, and an edge portion of each of the first and second openings 49 and 59 has a fan-shape. The first and second linear movement wings 40 and 50 may be made of a plastic material or may be made as a thin metal plate.

The first and second linear movement wings 40 and 50 may have symmetric shapes with each other. Linear guides (as described more in detail below) are provided between the case 10 and the first linear movement wing 40 and between the case 10 and the second linear movement wing 50 so as to guide linear movement of the first and second linear movement wings 40 and 50.

In the exemplary embodiment shown in FIG. 1, the linear guides include: linear movement guide protrusions 10a arranged on an inner side of the case 10; and linear slots 47, 48, 57, and 58 formed in the first and second linear movement wings 40 and 50 to receive the linear movement guide protrusions 10a.

However, the inventive concept is not limited to the exemplary embodiment shown in FIG. 1. For example, linear slots may be formed in the case 10, and protrusions may be arranged on the first and second linear movement wings 40 and 50. In another exemplary embodiment, grooves may be formed in both inner lateral edge portions of the case 10, and both lateral edge portions of the first and second linear movement wings 40 and 50 may be inserted into the grooves.

Because the linear movement guide protrusions 10a of the case 10 are inserted into the linear slots 47, 48, 57, and 58 of the first and second linear movement wings 40 and 50, the first and second linear movement wings 40 and 50 may be prevented from moving in a y-axis direction shown in FIG. 1, and thus the first and second linear movement wings 40 and 50 may be linearly moved only in the x-axis direction. The case 10 includes linear protrusions 10b configured to be in contact with a surface of the first linear movement wing 40 to guide linear movement of the first linear movement wing 40. The linear protrusions 10b reduce frictional resistance between the first linear movement wing 40 and the case 10.

The link 20 is rotatably provided on the case 10. The first linear movement wing 40 is connected to a side of a rotation center 21 of the link 20, and the second linear movement wing 50 is connected to another side of the rotation center 21 of the link 20.

The link 20 includes: a first connection protrusion 22 protruding upward in a z-axis direction from an end portion of the side of the rotation center 21; a second connection protrusion 23 protruding upward in the z-axis direction from an end portion of the other side of the rotation center 21; and a third connection protrusion 24 protruding upward in the z-axis direction between the first connection protrusion 22 and the rotation center 21.

The first linear movement wing 40 includes a first connection hole 41 to receive the first connection protrusion 22, and the second linear movement wing 50 includes a second connection hole 51 to receive the second connection protrusion 23. The first and second connection holes 41 and 51 extend in the y-axis direction across linear movement directions of the first and second linear movement wings 40 and 50, that is, across an x-axis.

The above-described arrangement of the first and second connection protrusions 22 and 23 and the first and second connection holes 41 and 51 for connecting the link 20 to the first and second linear movement wings 40 and 50 is a non-limiting exemplary embodiment. For example, connection holes may be formed in both end portions of the link 20, and connection protrusions may be respectively arranged on the first and second linear movement wings 40 and 50.

Figure 2:
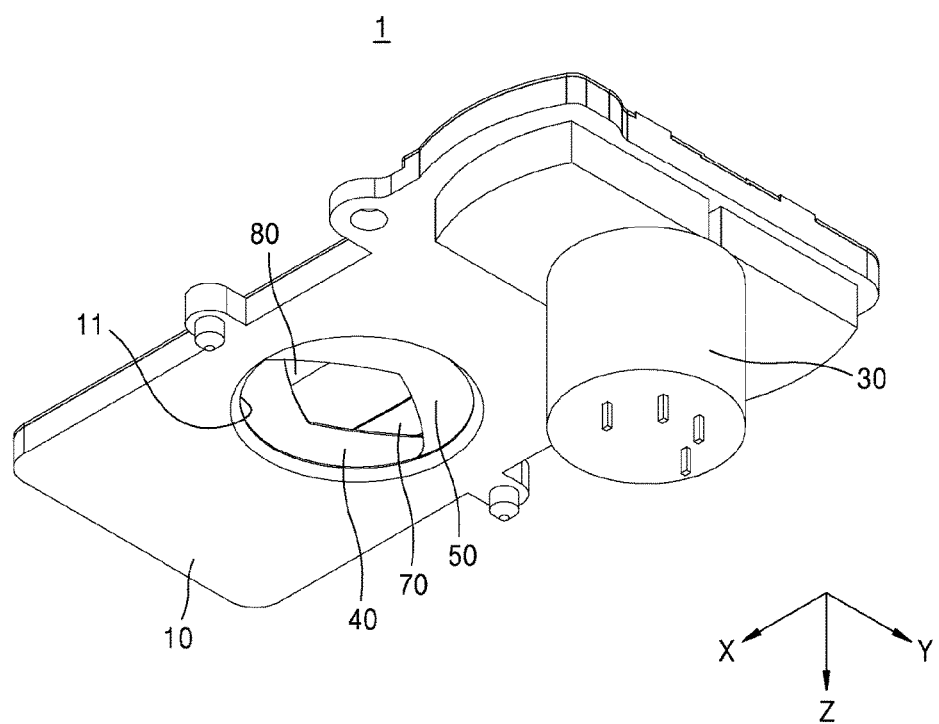
FIG. 2 is a bottom perspective view illustrating an assembled state of the light amount adjusting device depicted in FIG. 1.
Figure 3:
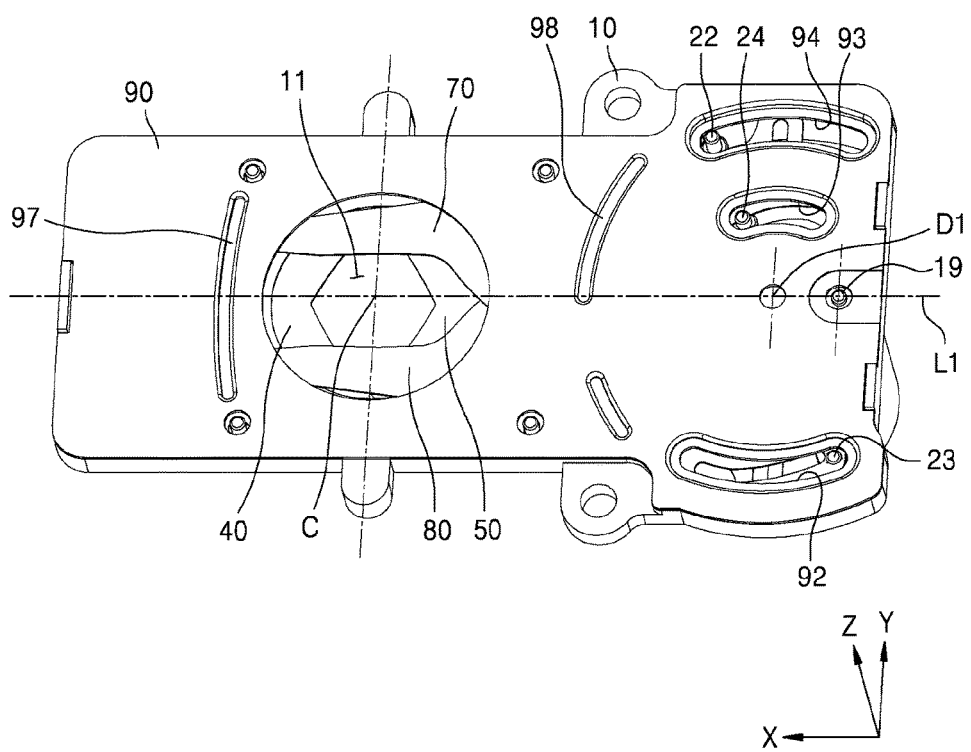
FIG. 3 is a top perspective view illustrating the light amount adjusting device depicted in FIG. 2.

FIG. 2 is a bottom perspective view illustrating an assembled state of the light amount adjusting device 1 depicted in FIG. 1. FIG. 3 is a top perspective view illustrating the light amount adjusting device 1 depicted in FIG. 2.

The driving unit 30 is placed on an outer side of the case 10. The driving unit 30 may generate driving force in response to an electric signal transmitted from an external device so as to drive the link 20 illustrated in FIG. 1.

Referring back to FIG. 1, a driving shaft 31 of the driving unit 30 may penetrate the case 10 and protrude inward in a rotatable manner relative to the case 10. The driving shaft 31 may be coupled to the rotation center 21 of the link 20, and thus the link 20 and the driving shaft 31 may be rotated together relative to the case 10.

Rotation holes 72 and 82 of the first and second rotation wings 70 and 80 are coupled to a rotation support shaft 19 provided on the case 10 in such a manner that the first and second rotation wings 70 and 80 are rotatable with respect to the rotation support shaft 19. Therefore, the first and second rotation wings 70 and 80 may be rotated with respect to the rotation support shaft 19 (i.e., the rotation support axis becomes the axis of rotation of the first and second rotation wings 70 and 80) relative to the case 10 in the opposite directions with respect to each other. The first and second rotation wings 70 and 80 may be made of a plastic material or may be made as a thin metal plate. The distance between the first connection protrusion 22 and the rotation center 21 of the link 20 is identical to the distance between the second connection protrusion 23 and the rotation center 21 of the link 20.

Referring to FIG. 3, the rotation support shaft 19 of the case 10 coupled to the rotation holes 72 and 82 of the first and second rotation wings 70 and 80 is located on a straight line L1 passing through a center C of the aperture 11 and the rotation center 21 (D1) of the link 20. Therefore, rotation centers of the first and second rotation wings 70 and 80 are also located on the straight line L1 passing through the center C of the aperture 11 and the rotation center 21 (D1) of the link 20.

Owing to the above-described arrangement of the first and second rotation wings 70 and 80, a mechanism formed by the first and second rotation wings 70 and 80 is rotatable in an interacting relationship with the rotation of the link 20 so as to define a portion of an opening through which light passes.

In addition, because the rotation centers of the first and second rotation wings 70 and 80 are located on the straight line L1, the trajectories of a first rotation guide hole 71 and a second rotation guide hole 81 may be defined within the case 10 and do not project out from the case 10. Therefore, an internal space of the case 10 for allowing rotation of the first and second rotation wings 70 and 80 may be reduced, and thus the light amount adjusting device 1 may have a compact structure.

The second rotation wing 80 includes the second rotation guide hole 81 to receive the second connection protrusion 23 of the link 20. The second rotation guide hole 81 includes: a cam hole 81a for guiding rotation of the second rotation wing 80; and a circumferential hole 81b connected to the cam hole 81a and extending in a circumferential direction with respect to the rotation center 21 of the link 20. The cam hole 81a extends in a circumferential direction with respect to the rotation center 21 and is curved in a radial direction with respect to the rotation center 21.

The link 20 includes the third connection protrusion 24 between the rotation center 21 and the first connection protrusion 22. The first rotation wing 70 includes the first rotation guide hole 71 to receive the third connection protrusion 24 of the link 20. The first rotation guide hole 71 extends in a circumferential direction centered on the rotation hole 72 of the first rotation wing 70 and is curved in a radial direction with respect to the rotation hole 72 of the first rotation wing 70.

The first rotation wing 70 is connected to the link 20 by inserting the third connection protrusion 24 into the first rotation guide hole 71 of the first rotation wing 70. When the link 20 is rotated, rotation force is transmitted from the link 20 to the first rotation guide hole 71 through the third connection protrusion 24, and thus the first rotation wing 70 is rotated in an interacting relationship with the rotation of the link 20.

The second rotation wing 80 is connected to the link 20 by inserting the second connection protrusion 23 into the second rotation guide hole 81 of the second rotation wing 80. Therefore, when the link 20 is rotated, rotation force is transmitted from the link 20 to the second rotation guide hole 81 through the second connection protrusion 23, and thus the second rotation wing 80 is rotated in an interacting relationship with the rotation of the link 20.

Because the first rotation wing 70 is connected to a side of the link 20 and the second rotation wing 80 is connected to another side of the link 20, the first and second rotation wings 70 and 80 are rotated in opposite directions by rotation of the link 20.

If the link 20 is rotated clockwise, the first rotation wing 70 is rotated counterclockwise to close the aperture 11, and the second rotation wing 80 is rotated clockwise to close the aperture 11.

If the link 20 is rotated counterclockwise, the first rotation wing 70 is rotated clockwise to open the aperture 11, and the second rotation wing 80 is rotated counterclockwise to open the aperture 11.

The first and second rotation wings 70 and 80 respectively include accommodation recesses 70a and 80a, and the accommodation recesses 70a and 80a respectively accommodate the linear movement guide protrusions 10a of the case 10 when the first and second rotation wings 70 and 80 are in a maximally opened state.

The cover 90 includes outer rotation slot portions 92 and 94 into which end portions of the first and second connection protrusions 22 and 23 are respectively inserted, and an inner rotation slot portion 93 into which an end portion of the third connection protrusion 24 is inserted. The rotation slot portions 92, 93, and 94 extend in a circumferential direction with respect to the rotation center 21 of the link 20 to guide rotation of the first to third connection protrusions 22, 23, and 24. The cover 90 also includes rotation guide rails 97 and 98 configured to support the first and second rotation wings 70 and 80 by contacting at least one of the first and second rotation wings 70 and 80. The rotation guide rails 97 and 98 are curved by extending in rotation directions of the first and second rotation wings 70 and 80, and guide rotation movement of the first and second rotation wings 70 and 80.

When the above-described four wings, that is, the first linear movement wing 40, the second linear movement wing 50, the first rotation wing 70, and the second rotation wing 80 are placed between the case 10 and the cover 90, the four wings are at different heights in the space between the case 10 and the cover 90. Because the first and second linear movement wings 40 and 50 and the first and second rotation wings 70 and 80 are arranged in a region from the linear protrusions 10b of the case 10 to the rotation guide rails 97 and 98 of the cover 90 (refer to FIG. 1), interference between the four wings, interference between the cover 90 and the four wings, and mechanical interference between the case 10 and the four wings may be reduced. Therefore, power of the driving unit 30 for driving the four wings may be reduced.

Figure 4:
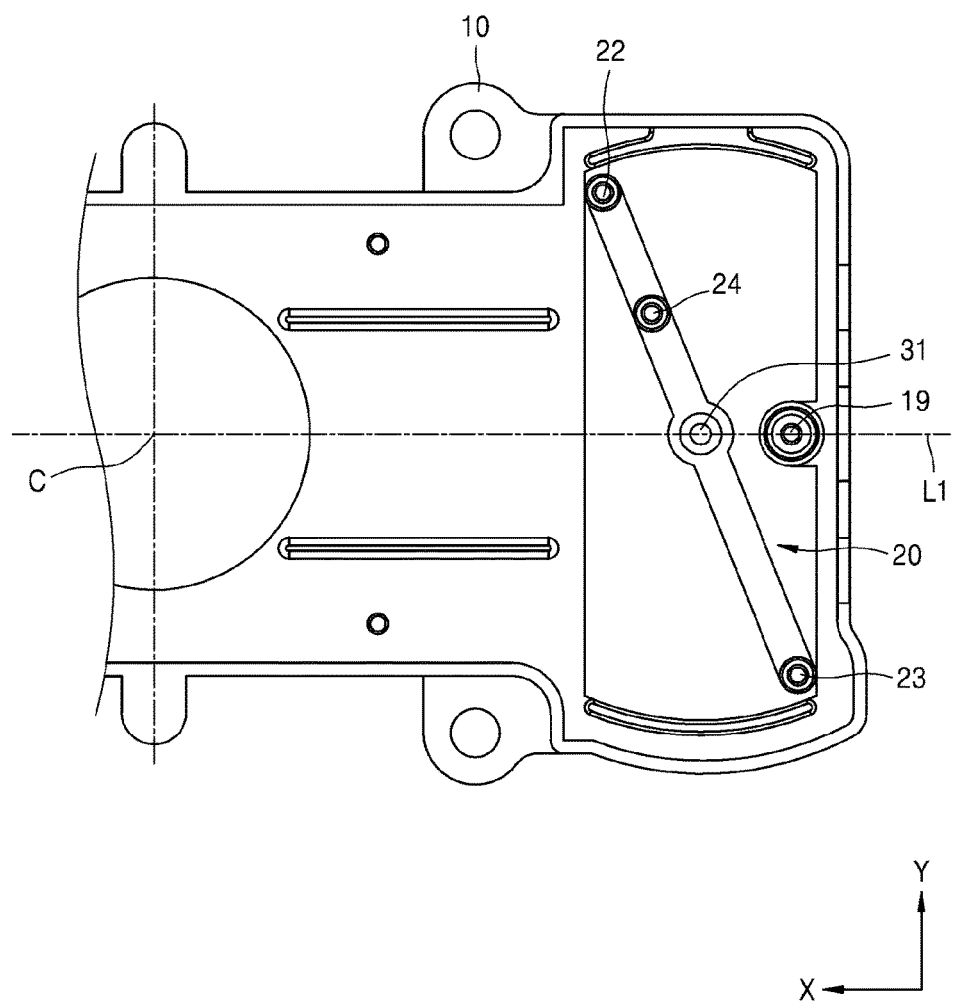
FIG. 4 is a top view illustrating an operational state of an inner part of the light amount adjusting device depicted in FIG. 2.
Figure 5:
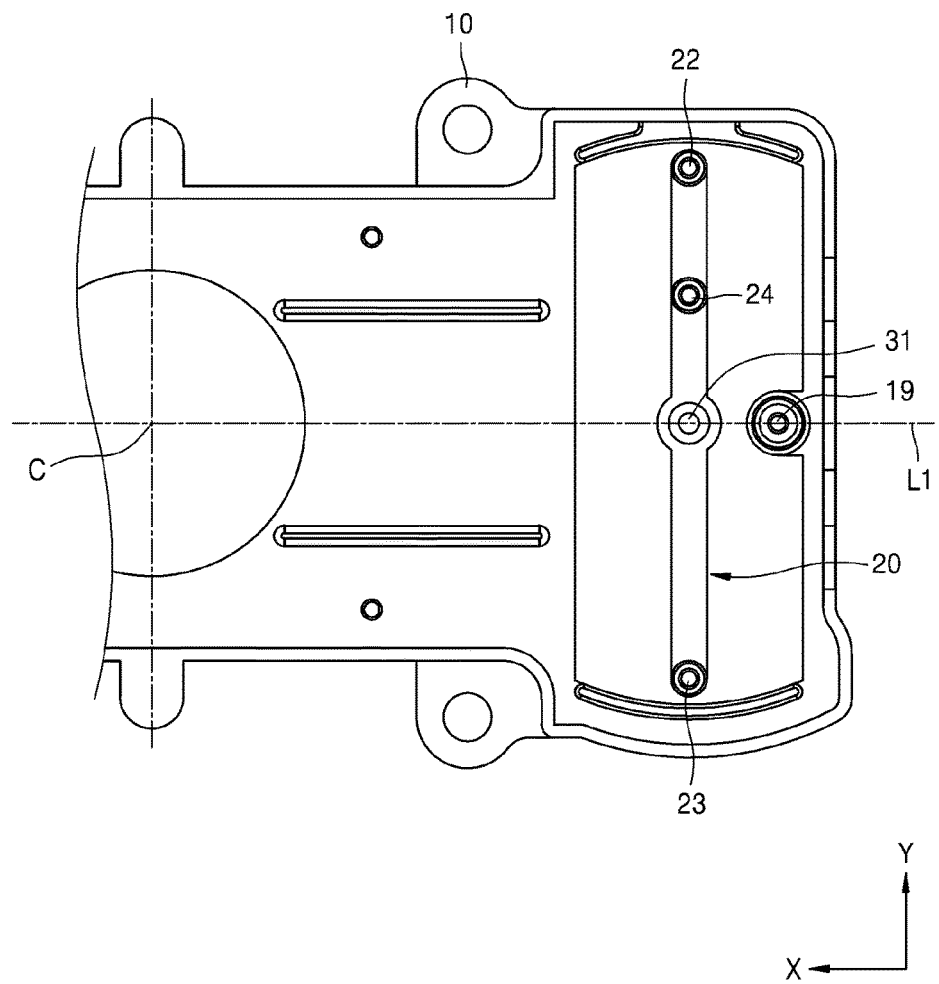
FIG. 5 is a top view illustrating another operational state of the inner part of the light amount adjusting device depicted in FIG. 4.
Figure 6:
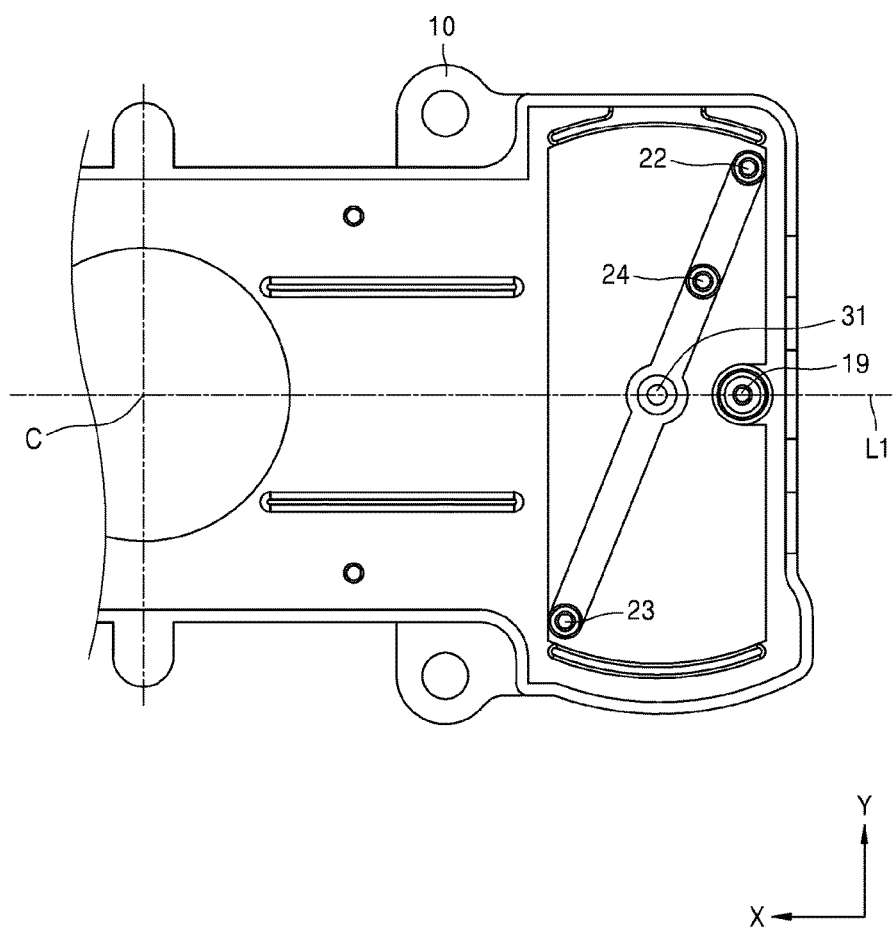
FIG. 6 is a top view illustrating another operational state of the inner part of the light amount adjusting device depicted in FIG. 4.

FIG. 4 is a top view illustrating a first operational state of an inner part of the light amount adjusting device 1 depicted in FIG. 2, FIG. 5 is a top view illustrating a second operational state of the inner part of the light amount adjusting device 1 depicted in FIG. 4, and FIG. 6 is a top view illustrating a third operational state of the inner part of the light amount adjusting device 1 depicted in FIG. 4. FIGS. 4, 5, and 6 together illustrate, for example, a clockwise rotation of the link 20 of the light amount adjusting device 1.

Figure 7:
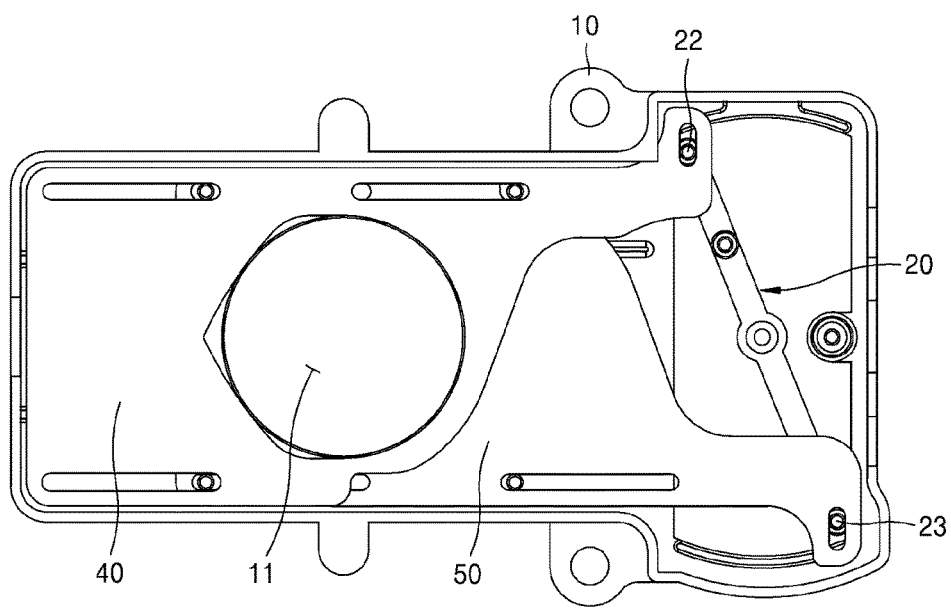
FIG. 7 is a top view illustrating an operational state of first and second linear movement wings in the light amount adjusting device depicted in FIG. 2.

FIG. 7 is a top view illustrating an operational state of the first and second linear movement wings 40 and 50 in the light amount adjusting device 1. FIG. 7 illustrates the positions of the first and second linear movement wings 40 and 50 when the link 20 of the light amount adjusting device 1 is in the state illustrated in FIG. 4.

Because the second linear movement wing 50 is connected to the second connection protrusion 23 of the link 20 and the first linear movement wing 40 is connected to the first connection protrusion 22 of the link 20, rotation of the link 20 is transmitted to the first and second linear movement wings 40 and 50. Because the case 10 allows the first and second linear movement wings 40 and 50 to linearly move only along the x-axis, when the link 20 is rotated, the first and second linear movement wings 40 and 50 are linearly moved along the x-axis in opposite directions from each other. Referring to FIG. 7, the first and second linear movement wings 40 and 50 are moved away from each other, and the aperture 11 is completely opened.

Figure 8:
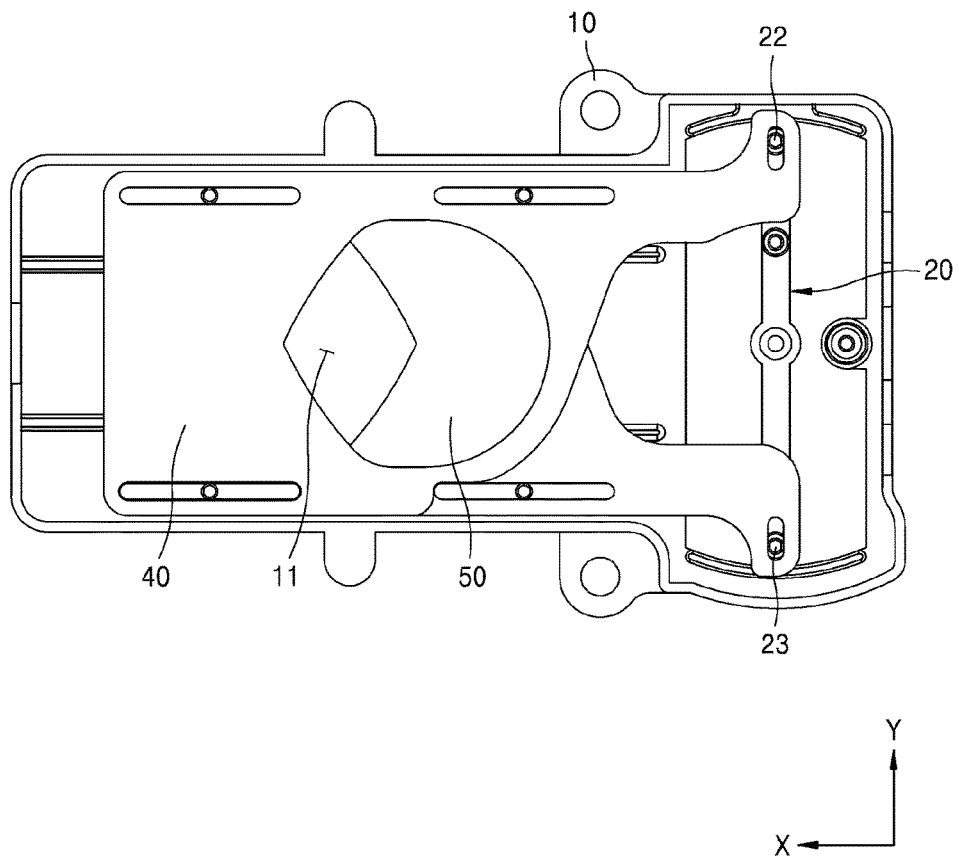
FIG. 8 is a top perspective view illustrating another operational state of the light amount adjusting device depicted in FIG. 7.

FIG. 8 is a top perspective view illustrating a second operational state of the light amount adjusting device 1. FIG. 8 illustrates the positions of the first and second linear movement wings 40 and 50 when the link 20 of the light amount adjusting device 1 is in the state illustrated in FIG. 5.

When the state shown in FIG. 8 is compared with the state shown in FIG. 7, the first and second linear movement wings 40 and 50 are moved close to each other toward the center of the aperture 11 in comparison with FIG. 7, and thus the aperture 11 is partially closed.

Figure 9:
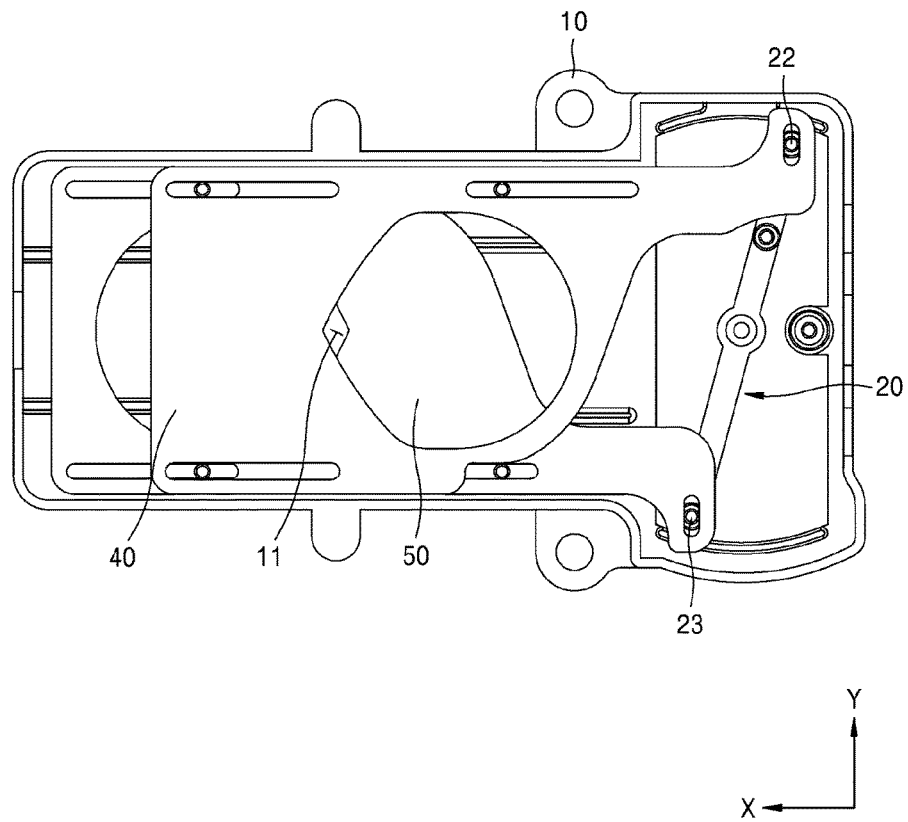
FIG. 9 is a top perspective view illustrating another operational state of the light amount adjusting device depicted in FIG. 7.

FIG. 9 is a top perspective view illustrating a third operational state of the light amount adjusting device 1 depicted in FIG. 7. FIG. 9 illustrates the positions of the first and second linear movement wings 40 and 50 when the link 20 of the light amount adjusting device 1 is in the state illustrated in FIG. 6.

When the state shown in FIG. 9 is compared with the state shown in FIG. 8, the first and second linear movement wings 40 and 50 are moved closer to each other toward the center of the aperture 11 in comparison with FIG. 8, and thus the aperture 11 is further closed.

Figure 10:
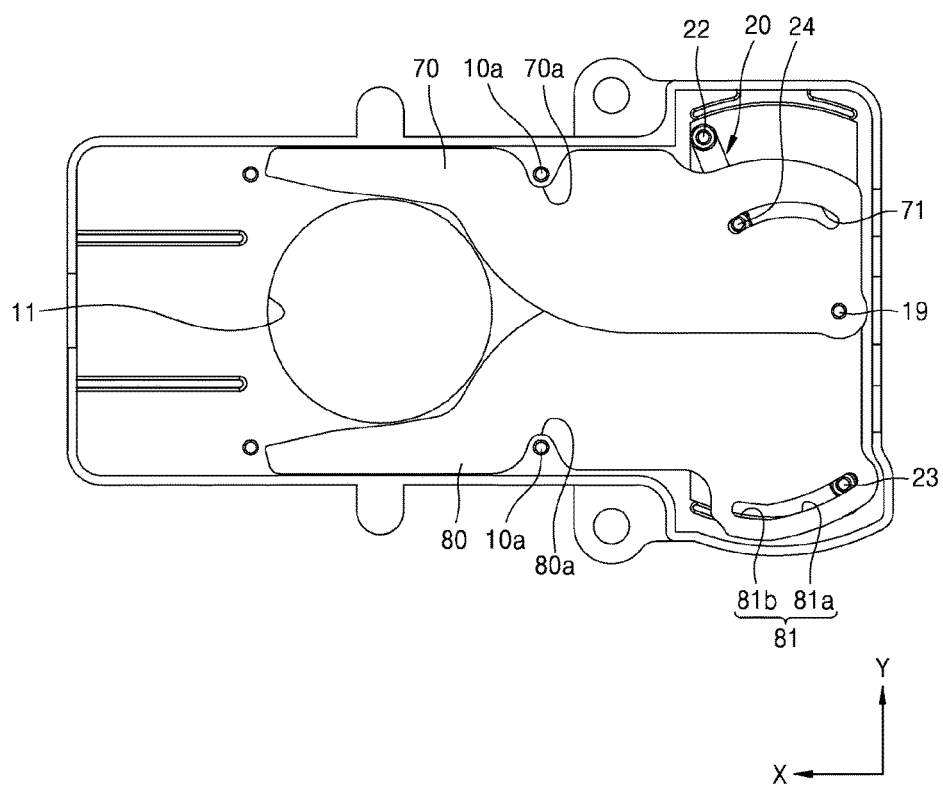
FIG. 10 is a top view illustrating an operational state of first and second rotation wings in the light amount adjusting device depicted in FIG. 2.

FIG. 10 is a top view illustrating an operational state of the first and second rotation wings 70 and 80 in the light amount adjusting device 1. FIG. 10 illustrates the positions of the first and second rotation wings 70 and 80 when the link 20 of the light amount adjusting device 1 is in the state illustrated in FIG. 4.

The second connection protrusion 23 of the link 20 is inserted in the second rotation guide hole 81 of the second rotation wing 80, and the third connection protrusion 24 of the link 20 is inserted in the first rotation guide hole 71 of the first rotation wing 70. Because the second connection protrusion 23 transmits power to the cam hole 81a of the second rotation guide hole 81, the second rotation wing 80 is rotated by the second connection protrusion 23. Similarly, because the third connection protrusion 24 transmits power to the first rotation guide hole 71, the first rotation wing 70 is rotated by the third connection protrusion 24.

Therefore, rotation of the link 20 is transmitted to the first rotation wing 70 and the second rotation wing 80 through the third connection protrusion 24 and the second connection protrusion 23, respectively, and thus the first and second rotation wings 70 and 80 may be rotated in opposite directions from each other.

Referring to FIG. 10, the first rotation wing 70 is rotated clockwise maximally, and the second rotation wing 80 is rotated counterclockwise maximally. Thus, the aperture 11 is completely opened.

Figure 11:
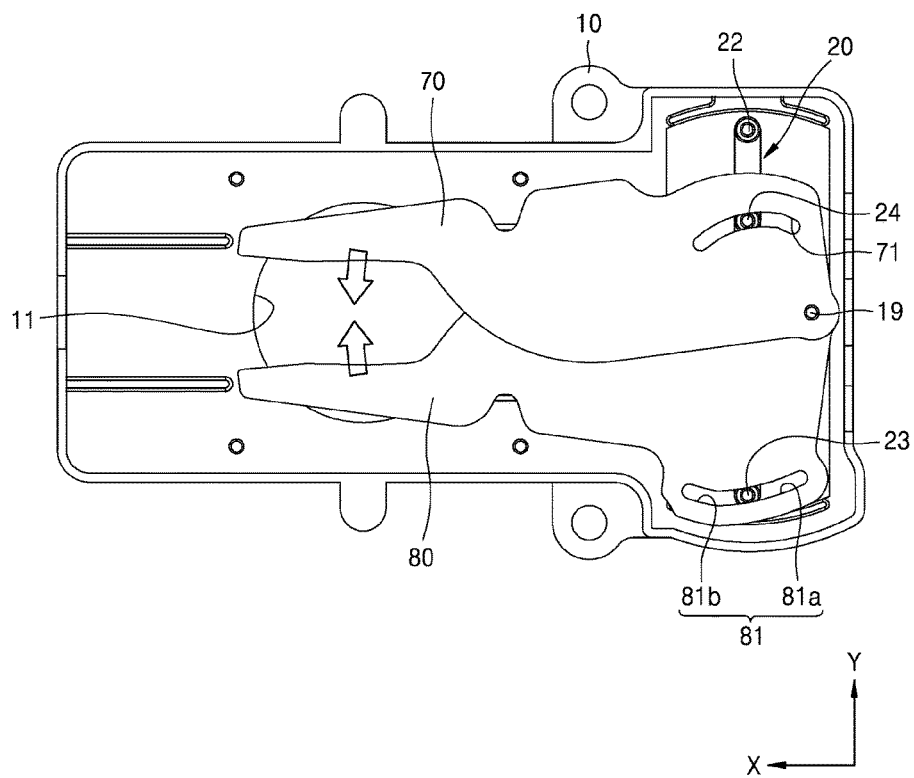
FIG. 11 is a top perspective view illustrating another operational state of the light amount adjusting device depicted in FIG. 10.

FIG. 11 is a top perspective view illustrating another operational state of the light amount adjusting device 1 depicted in FIG. 10. FIG. 11 illustrates the positions of the first and second rotation wings 70 and 80 when the link 20 of the light amount adjusting device 1 is in the state illustrated in FIG. 5.

When the state shown in FIG. 11 is compared with the state shown in FIG. 10, the first rotation wing 70 is slightly rotated counterclockwise toward the center of the aperture 11, and the second rotation wing 80 is slightly rotated clockwise toward the center of the aperture 11. Thus, the aperture 11 is partially closed.

Figure 12:
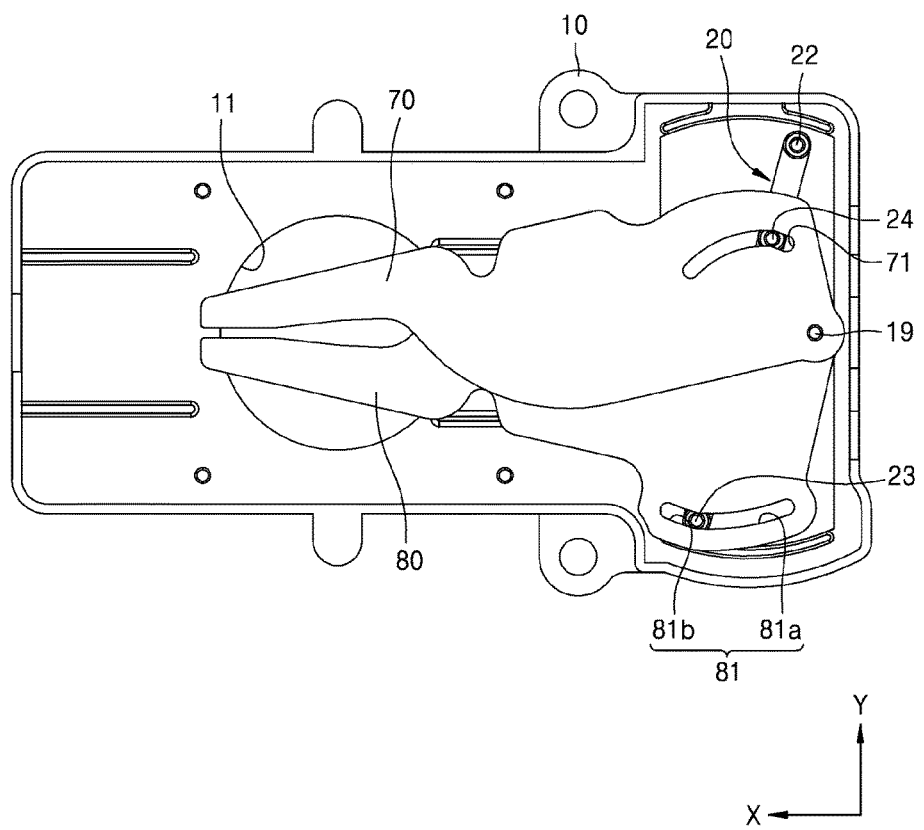
FIG. 12 is a top perspective view illustrating another operational state of the light amount adjusting device depicted in FIG. 10.

FIG. 12 is a top perspective view illustrating a second operational state of the light amount adjusting device 1. FIG. 12 illustrates the positions of the first and second rotation wings 70 and 80 when the link 20 of the light amount adjusting device 1 is in the state illustrated in FIG. 6.

When the state shown in FIG. 12 is compared with the state shown in FIG. 11, the first rotation wing 70 is further rotated counterclockwise toward the center of the aperture 11, and the second rotation wing 80 is further rotated clockwise toward the center of the aperture 11. Thus, a center region of the aperture 11 is partially closed.

Figure 13:
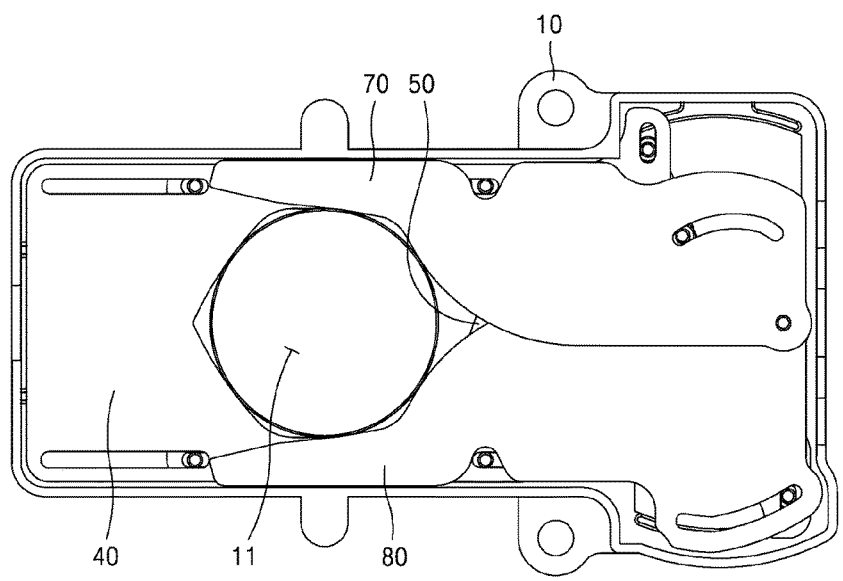
FIG. 13 is a top view illustrating an operational state of the first and second linear movement wings and the first and second rotation wings in the light amount adjusting device depicted in FIG. 2.
Figure 14:
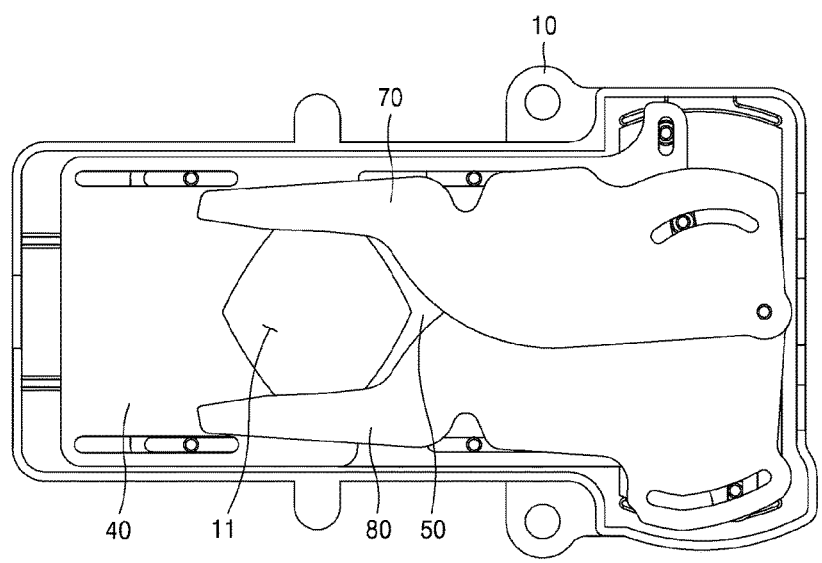
FIG. 14 is a top perspective view illustrating another operational state of the light amount adjusting device depicted in FIG. 13.
Figure 15:
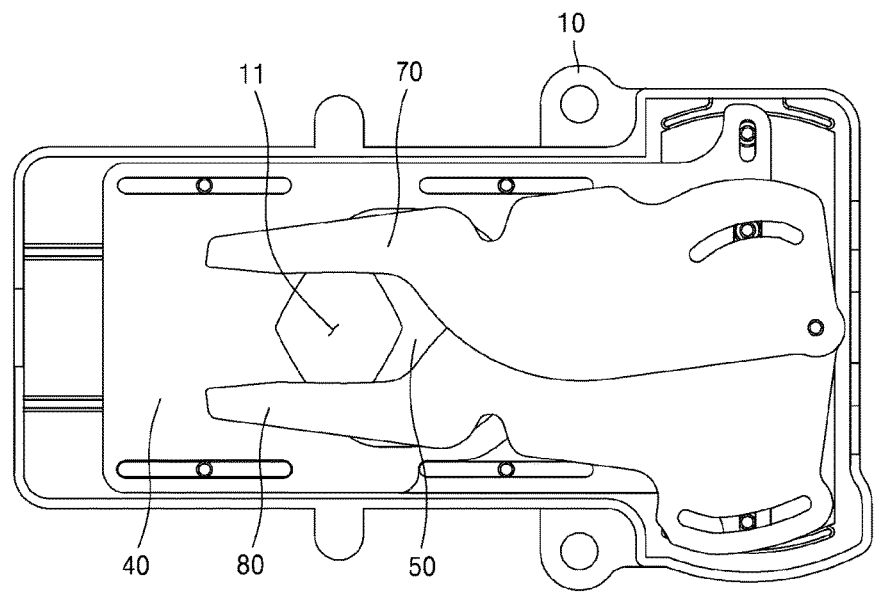
FIG. 15 is a top perspective view illustrating another operational state of the light amount adjusting device depicted in FIG. 13.
Figure 16:
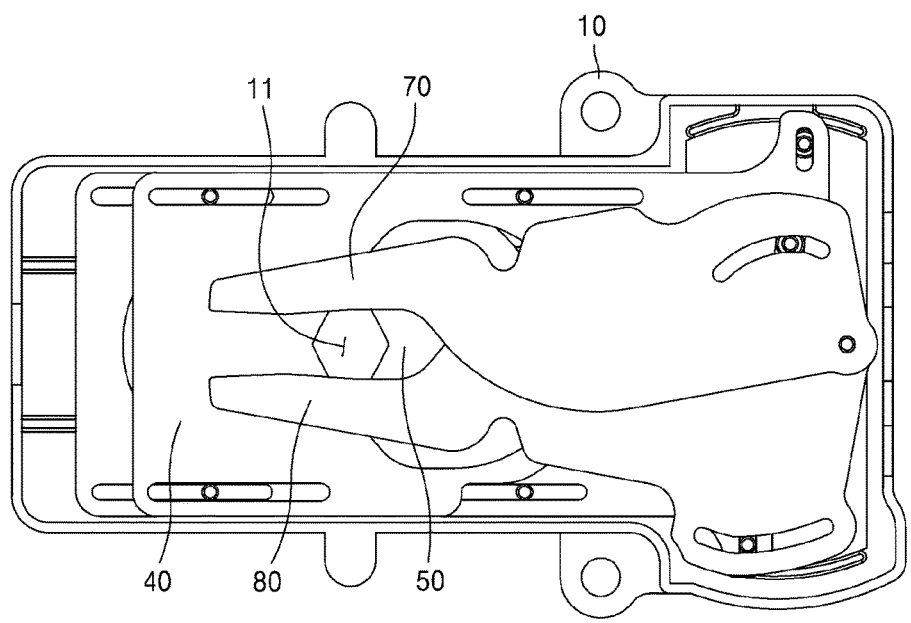
FIG. 16 is a top perspective view illustrating a state in which an aperture of the light amount adjusting device depicted in FIG. 15 is reduced.
Figure 16:
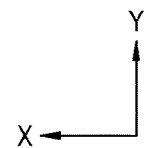
Figure 17:
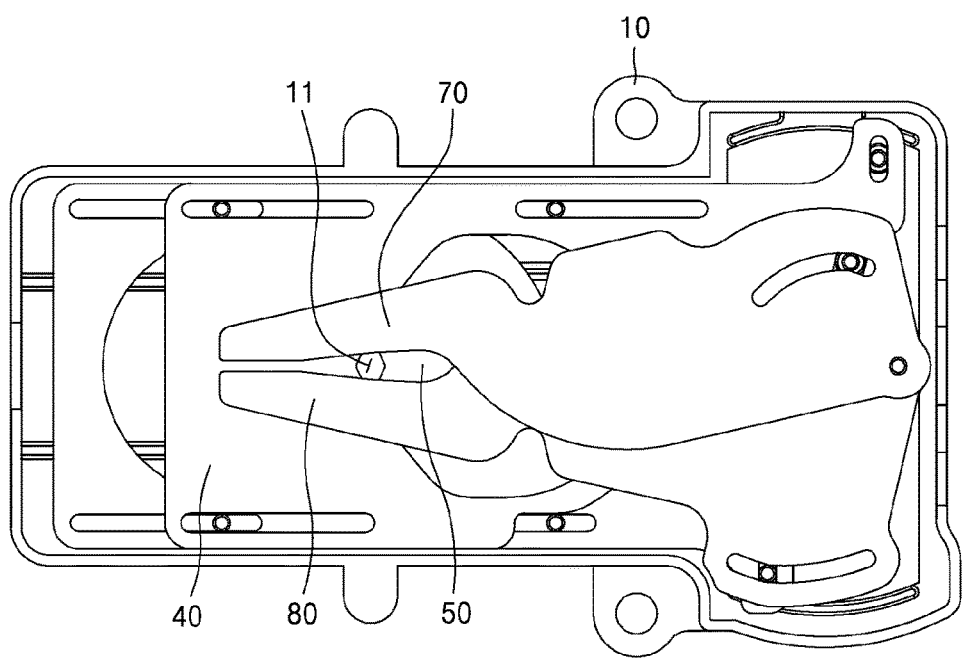
FIG. 17 is a top perspective view illustrating a state in which the aperture of the light amount adjusting device depicted in FIG. 16 is further reduced.
Figure 17:
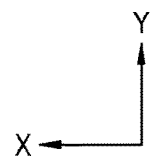

FIG. 13 is a top view illustrating operational states of the first and second linear movement wings 40 and 50 and the first and second rotation wings 70 and 80 in the light amount adjusting device 1. FIG. 14 is a top view illustrating another operational state of the light amount adjusting device 1. FIG. 15 is a top view illustrating another operational state of the light amount adjusting device 1. FIG. 16 is a top view illustrating a state in which the aperture 11 of the light amount adjusting device 1 depicted in FIG. 15 is reduced. FIG. 17 is a top view illustrating a state in which the aperture 11 of the light amount adjusting device 1 depicted in FIG. 16 is further reduced.

FIG. 13 illustrates an operational state in which the link 20 of the light amount adjusting device 1 is in the state shown in FIG. 4. FIG. 15 illustrates an operational state corresponding to the state shown in FIG. 5, and FIG. 17 illustrates an operational state corresponding to the state shown in FIG. 6.

Figure 18:
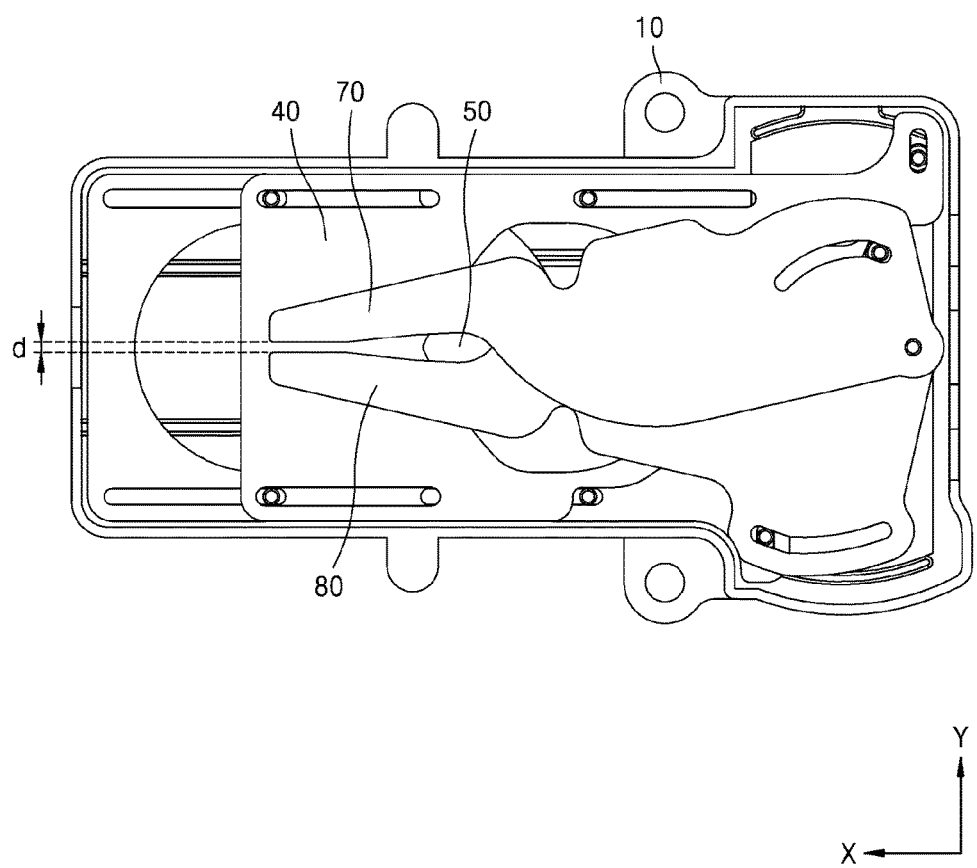
FIG. 18 is a top perspective view illustrating a state in which the aperture of the light amount adjusting device depicted in FIG. 17 is closed.

FIG. 18 is a top perspective view illustrating a state in which the aperture 11 of the light amount adjusting device 1 shown in FIG. 17 is closed.

While the link 20 is rotated clockwise from the position shown in FIG. 4 to the position shown in FIG. 6, the positions of the first and second linear movement wings 40 and 50 and the first and second rotation wings 70 and 80 of the light amount adjusting device 1 are varied as sequentially shown in FIGS. 13 to 17. If the link 20 is further rotated clockwise from the position shown in FIG. 6, the aperture 11 is closed as shown in FIG. 18.

Referring to FIG. 17, the second connection protrusion 23 inserted in the second rotation guide hole 81 of the second rotation wing 80 is at a boundary between the cam hole 81a and the circumferential hole 81b, and if the link 20 is further rotated clockwise from the position shown in FIG. 7, the second connection protrusion 23 of the link 20 is moved along the circumferential hole 81b.

Because the circumferential hole 81b extends in a circumferential direction with respect to the rotation center of the second rotation wing 80, while the second connection protrusion 23 of the link 20 is moved along the circumferential hole 81b, mechanical interference does not occur between the second connection protrusion 23 and the circumferential hole 81b. Therefore, when the second connection protrusion 23 is moved along the circumferential hole 81b, power is not transmitted from the link 20 to the second rotation wing 80, and thus the second rotation wing 80 is not rotated. However, the second connection protrusion 23 reaches the position shown in FIG. 18.

If the aperture 11 is completely closed as shown in FIG. 18, the second rotation wing 80 is not further rotated, and thus end portions of the first and second rotation wings 70 and 80 are not be brought into contact with each other but are maintained at a preset distance (d) from each other. Owing to this structure, mechanical interference between the first and second rotation wings 70 and 80 may be reduced, and relevant errors may be reduced.

If the link 20 starts to rotate counterclockwise from the state shown in FIG. 18, the center region of the aperture 11 is partially opened as shown in FIG. 17. If the link 20 is rotated counterclockwise from the position shown in FIG. 6 corresponding to the state shown in FIG. 17 to the position shown in FIG. 5 and is further rotated counterclockwise to the position shown in FIG. 4, the positions of the first and second rotation wings 70 and 80 and the first and second linear movement wings 40 and 50 of the light amount adjusting device 1 are varied as sequentially shown in FIGS. 17, 16, 15, 14, and 13, and the aperture 11 is opened.

As illustrated in FIGS. 14 to 17, while the size of the aperture 11 is varied by varying the positions of the first and second rotation wings 70 and 80 and the first and second linear movement wings 40 and 50 of the light amount adjusting device 1, the aperture 11 is maintained in a hexagonal shape similar to a circular shape.

When the aperture 11 is maintained in the hexagonal shape, four left and right sides of the hexagonal shape are formed by the first and second linear movement wings 40 and 50. In addition, when the aperture 11 is maintained in the hexagonal shape, two upper and lower sides of the hexagonal shape are formed by the first and second rotation wings 70 and 80.

As described above, while the size of the aperture 11 is varied from an almost maximally opened state to an almost minimally opened state, the aperture 11 is maintained in the hexagonal shape. Thus, optical problems with light amount adjusting devices of the related art having rhombus-shaped apertures may be solved, and the optical performance of the light amount adjusting device of the exemplary embodiment may be improved.

In addition, according to the above-described structure, the four wings of the light amount adjusting device 1, that is, the first and second rotation wings 70 and 80 and the first and second linear movement wings 40 and 50 may be effectively driven using the link 20 while the aperture 11 is maintained in the hexagonal shape using the four wings. Thus, the driving unit 30 may consume less power, and a space for arranging and operating the four wings may be reduced. Thus, the light amount adjusting device 1 may have a compact structure.

Figure 19:
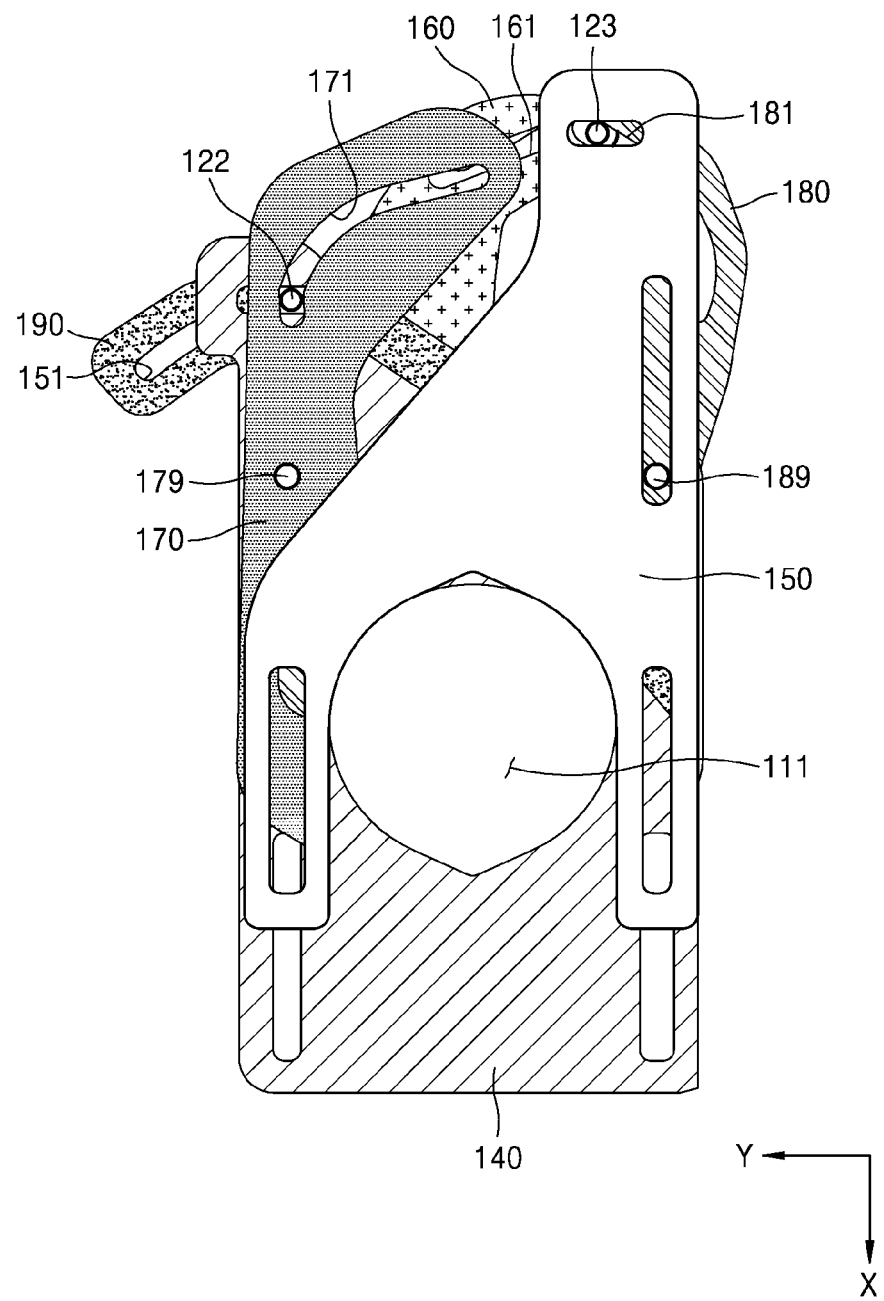
FIG. 19 is a top view illustrating an operational state of a light amount adjusting device according to a comparative example for comparison with the light amount adjusting device of the exemplary embodiments illustrated in FIGS. 1 to 17.
Figure 20:
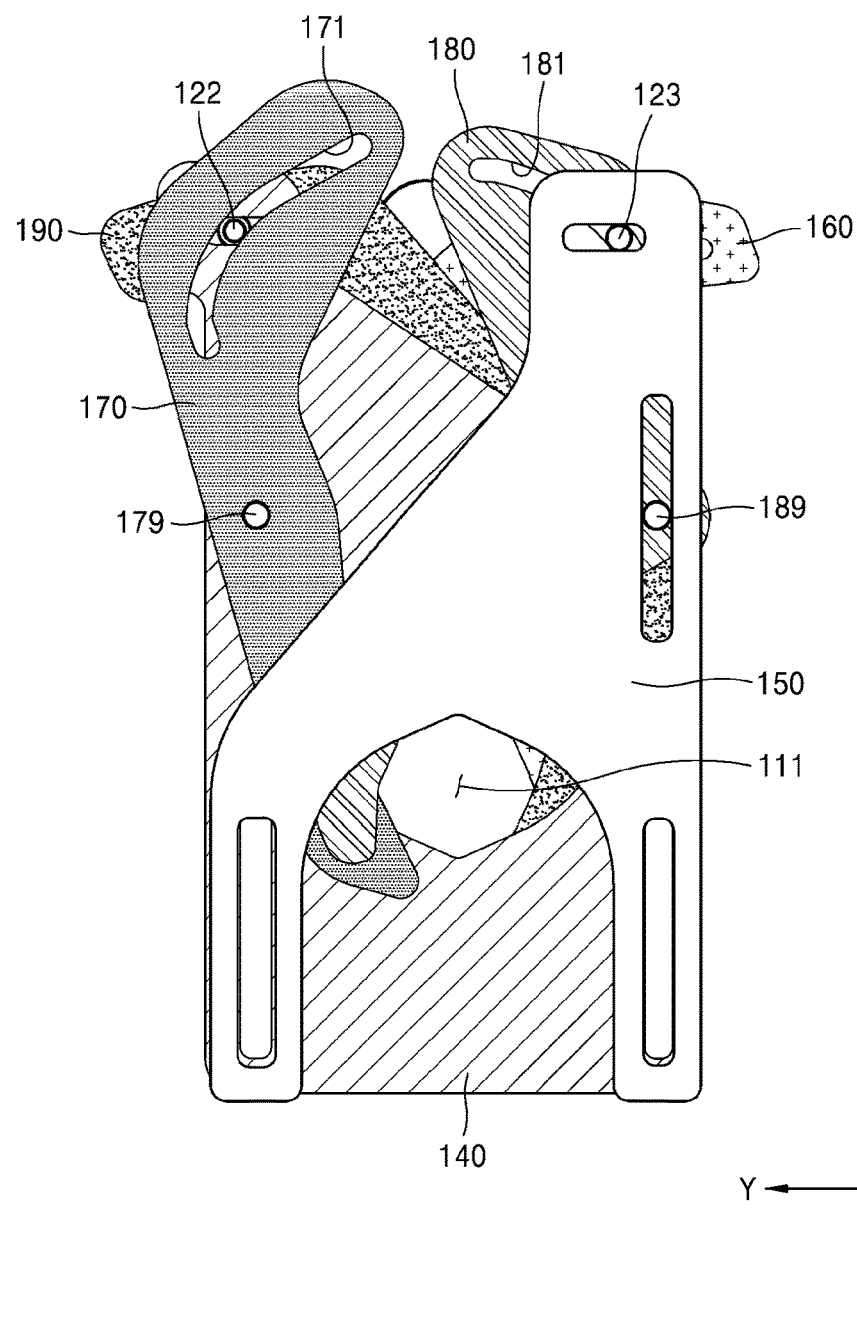
FIG. 20 is a top perspective view illustrating another operational state of the light amount adjusting device of the comparative example depicted in FIG. 19.

FIG. 19 is a top view illustrating an operational state of a light amount adjusting device according to a comparative example for comparison with the light amount adjusting device of the exemplary embodiment illustrated in FIGS. 1 to 17. FIG. 20 is a top view illustrating another operational state of the light amount adjusting device of the comparative example depicted in FIG. 19, and FIG. 21 is a top view illustrating another operational state of the light amount adjusting device of the comparative example depicted in FIG. 19.

Figure 21:
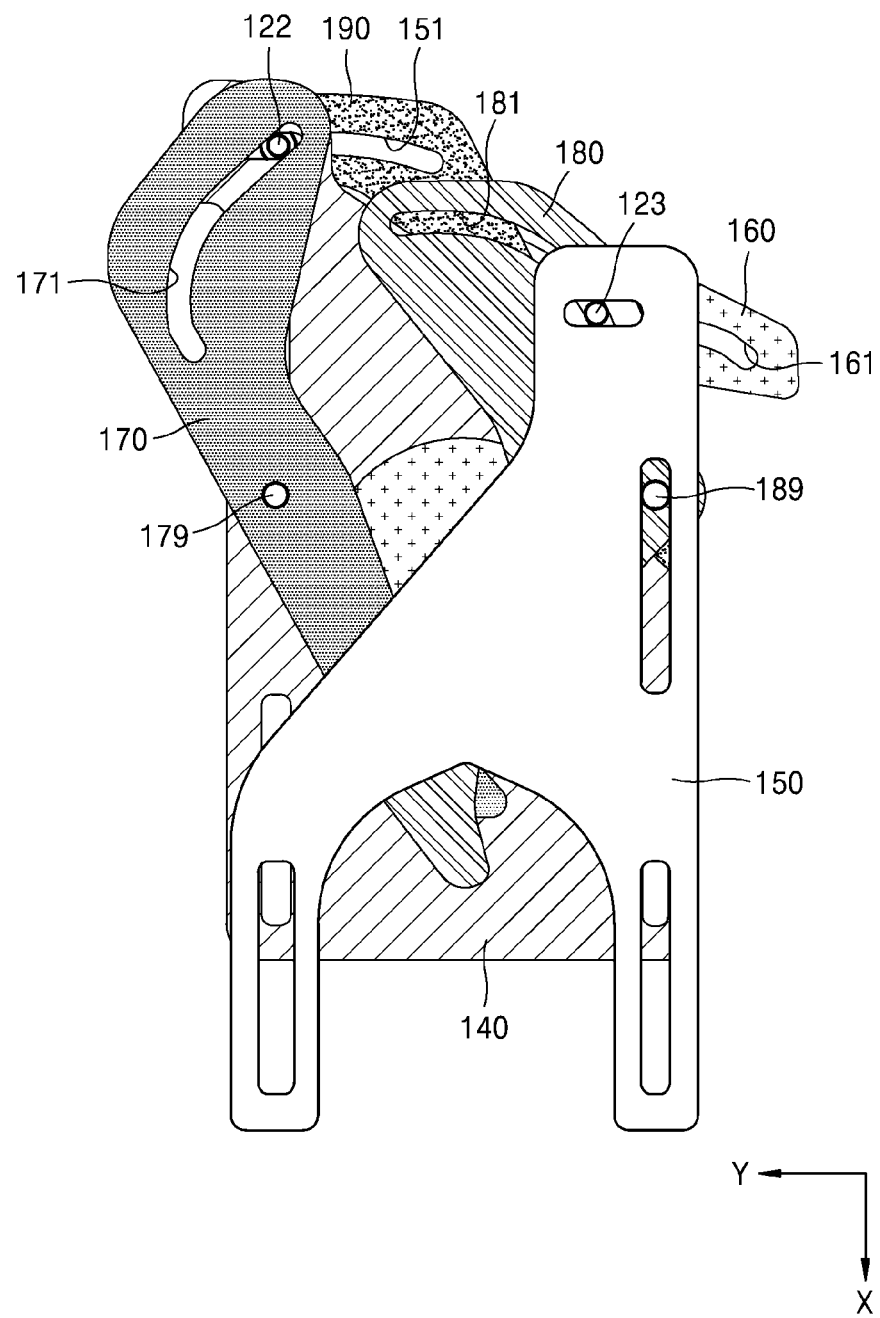
FIG. 21 is a top perspective view illustrating another operational state of the light amount adjusting device of the comparative example depicted in FIG. 19.

In the light amount adjusting device of the comparative example illustrated in FIGS. 19 to 21, an aperture 111 having a hexagonal shape may be opened or closed to transmit or block light.

However, unlike the light amount adjusting device 1 of the exemplary embodiment illustrated in FIGS. 1 to 17, the light amount adjusting device of the comparative example illustrated in FIGS. 19 to 21 includes a plurality of wings to form the aperture 111 having a hexagonal shape.

That is, the light amount adjusting device of the comparative example illustrated in FIGS. 19 to 21 includes six wings: two linear movement wings 140 and 150; a first rotation wing 170 and a second rotation wing 180 forming two sides of the aperture 111 having a hexagonal shape; and a third rotation wing 190 and a fourth rotation wing 160 forming another two sides of the aperture 111 having an hexagonal shape.

The first rotation wing 170 is configured to rotate on a rotation center 179 located at an outer position in a linear movement direction of the linear movement wings 130 and 140. A cam hole 171 of the first rotation wing 170 and a cam hole 151 of the third rotation wing 190 are guided by a first protrusion 122 of a link.

The second rotation wing 180 is configured to rotate on a rotation center 189 located at an outer position in the linear movement direction of the linear movement wings 130 and 140. A cam hole 181 of the second rotation wing 180 and a cam hole 161 of the fourth rotation wing 160 are guided by a second protrusion 123 of the link.

In the light amount adjusting device of the comparative example, the size of the aperture 111 having an approximately hexagonal shape may be adjusted using the six wings. However, the light amount adjusting device has a relative large size to ensure trajectories of the six wings, and a relative large thickness because the wings are large in number.

Figure 22:
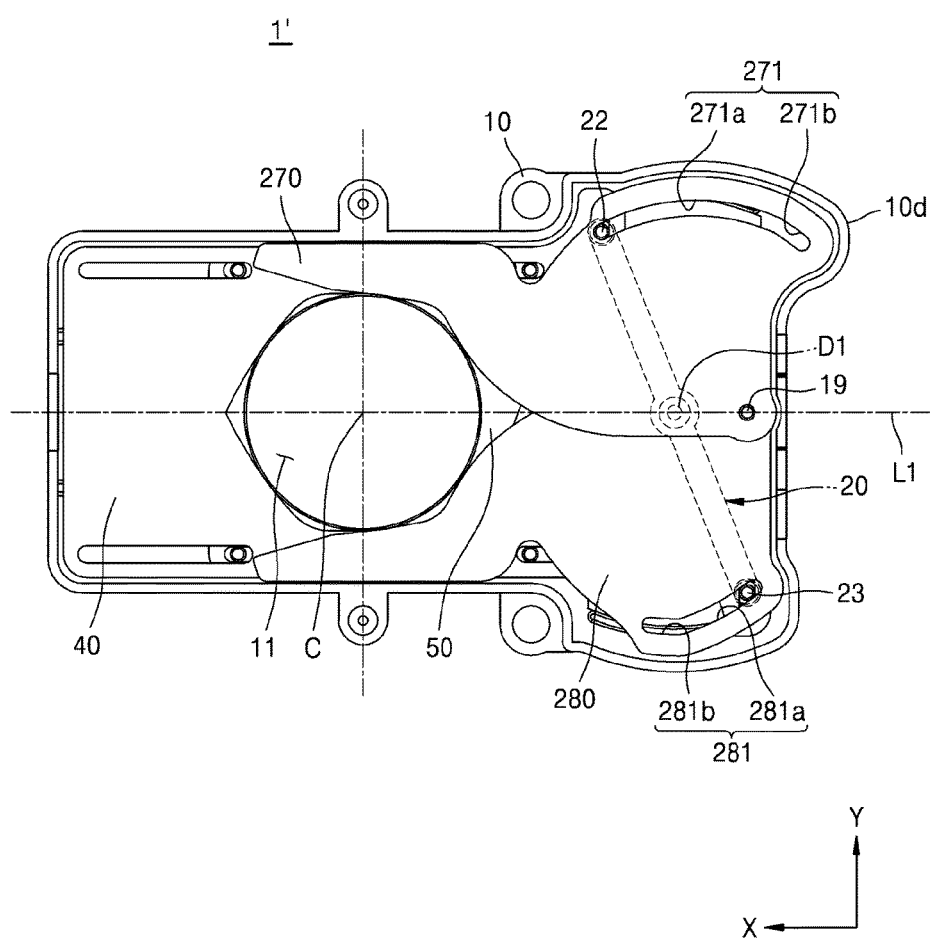
FIG. 22 is a top view illustrating a light amount adjusting device according to an exemplary embodiment.
Figure 23:
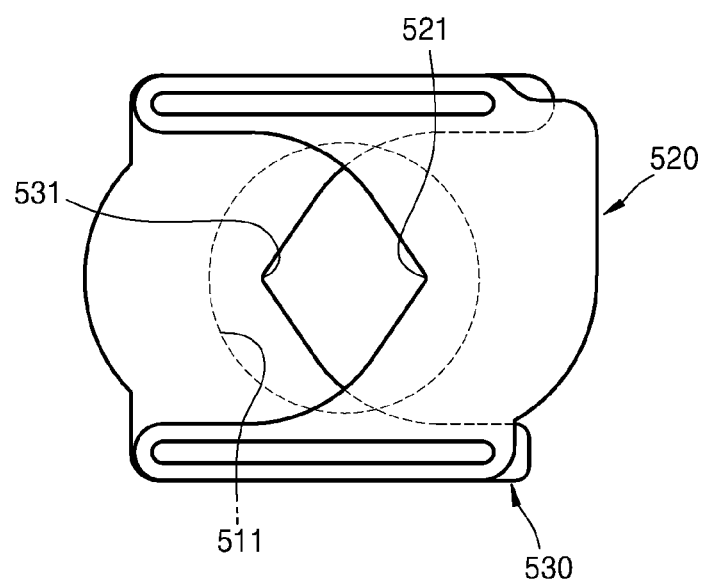
FIG. 23 is s schematic view illustrating an example of light amount adjusting devices of the related art.

FIG. 22 is a top view illustrating a light amount adjusting device 1' according to an exemplary embodiment.

The light amount adjusting device 1' of the exemplary embodiment illustrated in FIG. 22 is different from the light amount adjusting device 1 of the exemplary embodiment illustrated in FIGS. 1 to 17, in that a link 20 includes only two connection protrusions: a first connection protrusion 22 and a second connection protrusion 23.

The first connection protrusion 22 of the link 20 rotatably provided on the case 10 is coupled to a first linear movement wing 40 and a first rotation wing 270. The first connection protrusion 22 is inserted in a first rotation guide hole 271 of the first rotation wing 270.

The second connection protrusion 23 of the link 20 is coupled to a second linear movement wing 50 and a second rotation wing 280. The second connection protrusion 23 is inserted in a second rotation guide hole 281 of the second rotation wing 280.

The first and second rotation wings 270 and 280 are rotatably coupled to a rotation support shaft 19 provided on the case 10. Therefore, the first and second rotation wings 270 and 280 may be rotated on the rotation support shaft 19 relative to the case 10 in the opposite directions with respect to each other. Rotation centers of the first and second rotation wings 270 and 280 are located on a straight line L1 passing through a center C of an aperture 11 and a rotation center D1 of the link 20.

The first rotation guide hole 271 of the first rotation wing 270 includes: a first cam hole 271a for guiding rotation of the first rotation wing 270; and a first circumferential hole 271b connected to the first cam hole 271a and extending in a circumferential direction with respect to the rotation center D1 of the link 20. The first cam hole 271a extends in a circumferential direction with reference to the rotation center D1 of the link 20 and is curved in a radial direction with respect to the rotation center D1 of the link 20.

The second rotation guide hole 281 of the second rotation wing 280 includes: a second cam hole 281a for guiding rotation of the second rotation wing 280; and a second circumferential hole 281b connected to the second cam hole 281a and extending in a circumferential direction with respect to the rotation center D1 of the link 20. The second cam hole 281a extends in a circumferential direction with reference to the rotation center D1 of the link 20 and is curved in a radial direction with respect to the rotation center D1 of the link 20.

When the first connection protrusion 22 is in the first cam hole 271a, rotation force of the link 20 is transmitted to the first rotation wing 270, and when the second connection protrusion 23 is in the second cam hole 281a, rotation force of the link 20 is transmitted to the second rotation wing 280. Thus, the first and second rotation wings 270 and 280 may be rotated.

However, when the first connection protrusion 22 is in the first circumferential hole 271b, rotation force of the link 20 is not transmitted to the first rotation wing 270, and when the second connection protrusion 23 is in the second circumferential hole 281b, rotation force of the link 20 is not transmitted to the second rotation wing 280. Thus, the first and second rotation wings 270 and 280 are not further rotated, and end portions of the first and second rotation wings 270 and 280 may not overlap each other and mechanically interfere with each other.

Because the first rotation guide hole 271 of the first rotation wing 270 is connected to the first connection protrusion 22 of the link 20, the position of the first rotation guide hole 271 is changed to an outer region of the first rotation wing 270 compared to the position of the first rotation guide hole 71 of the exemplary embodiment described with reference to FIGS. 1 to 17. Therefore, the case 10 includes an outwardly extending portion 10d to guide rotation of the first rotation wing 270.

As described above, according to the one or more of the above exemplary embodiments, the light amount adjusting device is configured to maintain the aperture through light passes in a hexagonal shape similar to a circular shape while adjusting the size of the aperture using the first and second linear movement wings and the first and second rotation wings. Thus, the optical performance of the light amount adjusting device may be improved.

In addition, the four wings, that is, the first and second rotation wings and the first and second linear movement wings may be effectively rotated using the link. Thus, the driving unit may consume less power, and a space for arranging and operating the four wings may be reduced, thereby allowing the light amount adjusting device to have a compact structure.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been described above, it will be understood by those of ordinary skill in the art that various changes in form and details may be made therein without departing from the spirit and scope of the disclosure as defined by the following claims.

What is claimed is:

1. A light amount adjusting device comprising:
a case including an aperture through which light passes;
a link rotatably coupled to the case;
a driver configured to generate a driving force for rotating the link;
a first linear movement wing and a second linear movement wing respectively connected to a first side of a rotation center of the link and a second side opposite to the first side of the rotation center of the link, each of the first and second linear movement wings provided on the case and configured to linearly move in linear directions between a first position of the first linear movement wing and the second linear movement wing at which at least a portion of the aperture of the case is closed and a second position of the first linear movement wing and the second linear movement wing at which the aperture of the case is opened;
a first rotation wing connected to the link and rotatably coupled to the case so as to be rotated between a first position of the first rotation wing at which at least a portion of the aperture of the case is closed and a second position of the first rotation wing at which the aperture of the case is opened, the first rotation wing configured to rotate in directions crossing the linear directions of the first and second linear movement wings; and
a second rotation wing connected to the link and rotatably coupled to the case so as to be rotated between a first position of the second rotation wing at which at least a portion of the aperture of the case is closed and a second position of the second rotation wing at which the aperture of the case is opened, the second rotation wing configured to rotate in directions crossing the linear directions of the first and second linear movement wings,
wherein the light amount adjusting device includes only two rotation wings inclusive of the first and second rotation wings for adjusting the aperture of the case with the first and second linear movement wings.

2. The light amount adjusting device of claim 1, further comprising a plurality of linear guides provided between the case and the first linear movement wing and between the case and the second linear movement wing so as to guide linear movement of the first and second linear movement wings, and
wherein the first and second linear movement wings move in opposite directions with respect to each other.

3. The light amount adjusting device of claim 2, wherein each of the plurality of the linear guides comprises:
a linear movement guide protrusion arranged on an inner side of the case; and
a linear slot formed in the first and second linear movement wings to receive the linear movement guide protrusion.

4. The light amount adjusting device of claim 3, wherein each of the first and second rotation wings comprises an accommodation recess configured to accommodate the linear movement guide protrusion of the case in response to the first and second rotation wings being at the second positions at which the aperture of the case is opened.

5. The light amount adjusting device of claim 1, wherein each of the first and second linear movement wings comprises an opening corresponding to at least a portion of the aperture of the case so as to pass light.

6. A light amount adjusting device comprising:
a case including an aperture through which light passes;
a link rotatably coupled to the case;
a driver configured to generate a driving force for rotating the link;

a first linear movement wing and a second linear movement wing respectively connected to a first side of a rotation center of the link and a second side opposite to the first side of the rotation center of the link, each of the first and second linear movement wings provided on the case and configured to linearly move in linear directions between a first position of the first linear movement wing and the second linear movement wing at which at least a portion of the aperture of the case is closed and a second position of the first linear movement wing and the second linear movement wing at which the aperture of the case is opened;

a first rotation wing connected to the link and rotatably coupled to the case so as to be rotated between a first position of the first rotation wing at which at least a portion of the aperture of the case is closed and a second position of the first rotation wing at which the aperture of the case is opened, the first rotation wing configured to rotate in directions crossing the linear directions of the first and second linear movement wings; and a second rotation wing connected to the link and rotatably coupled to the case so as to be rotated between a first position of the second rotation wing at which at least a portion of the aperture of the case is closed and a second position of the second rotation wing at which the aperture of the case is opened, the second rotation wing configured to rotate in directions crossing the linear directions of the first and second linear movement wings, wherein the link comprises:
- a first connection protrusion protruding from the first side of the link;
- a second connection protrusion protruding from the second side of the link; and
- a third connection protrusion protruding between the first connection protrusion and the rotation center of the link; and wherein the first linear movement wing comprises a first connection hole configured to engage with the first connection protrusion, and the second linear movement wing comprises a second connection hole configured to engage with the second connection protrusion.

7. The light amount adjusting device of claim 6, wherein each of the first and second connection holes extends in a direction crossing the linear directions of the first and second linear movement wings.

8. The light amount adjusting device of claim 6, wherein a distance between the first connection protrusion and the rotation center of the link is identical to a distance between the second connection protrusion and the rotation center of the link.

9. The light amount adjusting device of claim 6, wherein the first rotation wing comprises a first rotation guide hole configured to engage with the third connection protrusion, the first rotation guide hole extending in a curved shape, and
wherein the second rotation wing comprises a second rotation guide hole configured to engage with the second connection protrusion, the second rotation wing extending in a curved shape.

10. The light amount adjusting device of claim 9, wherein the second rotation guide hole comprises:
- a cam hole configured to guide rotation of the second rotation wing; and
- a circumferential hole connected to the cam hole and extending in a circumferential direction with respect to the rotation center of the link.

11. The light amount adjusting device of claim 1, wherein the case further comprises a rotation support shaft rotatably supporting the first and second rotation wings, and
wherein the first and second rotation wings rotate in opposite directions with respect to each other.

12. The light amount adjusting device of claim 1, wherein rotation centers of the first and second rotation wings are on a line passing through a center of the aperture of the case and the rotation center of the link.

13. The light amount adjusting device of claim 1, wherein the case further comprises a linear protrusion protruding from an inside of the case and configured to contact at least one of a surface of the first linear movement wing and a surface of the second linear movement wing.

14. The light amount adjusting device of claim 6, further comprising a cover comprising an outer aperture corresponding to the aperture of the case, the cover coupled to the case and configured to cover the first and second linear movement wings, the first and second rotation wings, and the link.

15. The light amount adjusting device of claim 14, wherein the cover further comprises outer rotation slot portions into which end portions of the first and second connection protrusions are respectively inserted, the outer rotation slot portions extending in the circumferential direction with respect to the rotation center of the link and configured to guide rotation of the first and second connection protrusions.

16. The light amount adjusting device of claim 15, wherein the cover further comprises an inner rotation slot portion into which an end portion of the third connection protrusion is inserted, the inner rotation slot portion extending in the circumferential direction with respect to the rotation center of the link and configured to guide rotation of the third connection protrusion.

17. The light amount adjusting device of claim 3, further comprising a cover comprising a rotation guide rail having a curved shape and extending in a rotation direction of the first and second rotation wings, the rotation guide rail configured to guide rotation movement of the first and second rotation wings by contacting at least one of the first and second rotation wings.

18. The light amount adjusting device of claim 1, wherein the link comprises:
- a first connection protrusion protruding from the side of the link; and
- a second connection protrusion protruding from the other side of the line,
- wherein the first linear movement wing comprises a first connection hole configured to engage with the first connection protrusion,
- wherein the second linear movement wing comprises a second connection hole configured to engage with the second connection protrusion,
- wherein the first rotation wing comprises a first rotation guide hole configured to engage with the first connection protrusion and extending in a curved shape, and
- wherein the second rotation wing comprises a second rotation guide hole configured to engage with the second connection protrusion and extending in a curved shape.

19. The light amount adjusting device of claim 18, wherein the first rotation guide hole comprises:
- a first cam hole configured to guide rotation of the first rotation wing; and
- a first circumferential hole connected to the first cam hole and extending in a circumferential direction with respect to the rotation center of the link, wherein the second rotation guide hole comprises:
a second cam hole configured to guide rotation of the second rotation wing; and
a second circumferential hole connected to the second cam hole and extending in a circumferential direction with respect to the rotation center of the link.

20. A light amount adjusting device comprising:
a case including an aperture through which light passes;
a link rotatably coupled to the case;
a driver configured to generate a driving force for rotating the link;
a plurality of wings configured to form the aperture through which the light passes in a hexagonal shape, the plurality of wings comprising:
a first linear movement wing having a first opening and a second linear movement wing having a second opening, the first and second openings forming the aperture, the first and the second linear movement wings having symmetrical shapes and configured to linearly move in linear directions between a first position of the first linear movement wing and the second linear movement wing at which at least a portion of the aperture of the case is closed and a second position of the first linear movement wing and the second linear movement wing at which the aperture of the case is opened; and
a first rotation wing and a second rotation wing, the first and second rotation wings being connected to the link and rotatably coupled to the case so as to be rotated between a first position of the first rotation wing at which at least a portion of the aperture of the case is closed and a second position of the first rotation wing at which the aperture of the case is opened,
wherein the first and the second linear movement wings move in opposite directions of each other,
wherein the first and the second rotation wings move in opposite directions of each other, and
wherein the first opening is completely enclosed by the first linear movement wing and the second opening is completely enclosed by the second linear movement wing.

* * * * *